(12) United States Patent
Shibahara et al.

(10) Patent No.: US 12,176,952 B2
(45) Date of Patent: Dec. 24, 2024

(54) SIGNAL DETECTION APPARATUS, SIGNAL DETECTION METHOD AND PROGRAM

(71) Applicant: NIPPON TELEGRAPH AND TELEPHONE CORPORATION, Tokyo (JP)

(72) Inventors: Koki Shibahara, Musashino (JP); Takayuki Mizuno, Musashino (JP); Yutaka Miyamoto, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 124 days.

(21) Appl. No.: 18/019,013

(22) PCT Filed: Aug. 20, 2020

(86) PCT No.: PCT/JP2020/031435
§ 371 (c)(1),
(2) Date: Jan. 31, 2023

(87) PCT Pub. No.: WO2022/038739
PCT Pub. Date: Feb. 24, 2022

(65) Prior Publication Data
US 2023/0216589 A1     Jul. 6, 2023

(51) Int. Cl.
*H04J 14/04* (2006.01)
*H04B 10/2581* (2013.01)
*H04B 10/60* (2013.01)

(52) U.S. Cl.
CPC ......... *H04B 10/2581* (2013.01); *H04B 10/60* (2013.01); *H04J 14/04* (2013.01)

(58) Field of Classification Search
None
See application file for complete search history.

(56) References Cited

U.S. PATENT DOCUMENTS 9,294,146 B2 * 3/2016 Mumtaz .................. H04B 3/32
10,985,846 B2 * 4/2021 Shibahara ............ H04B 1/1027
(Continued)

OTHER PUBLICATIONS

A.K. Lenstra et al., "Factoring polynomials with rational coefficients", Mathematische Annalen, vol. 261, No. 4, pp. 515-534, 1982.
(Continued)

*Primary Examiner* — Jai M Lee

(57) ABSTRACT

The signal detection device includes the signal detection unit that derives the estimation vector of the transmission signal vector, the first conversion unit that converts the estimation vector of the transmission signal vector to the estimation vector of the transmission signal vector based on the reduced basis, the first determination unit that converts the estimation vector of the transmission signal vector based on the reduced basis to the determination value vector of the transmission signal vector, the first update unit that updates the separation matrix, the second conversion unit that converts the first error signal vector to the second error signal vector based on the reduced basis, the second update unit that updates the error covariance matrix based on the reduced basis, the second determination unit that determines whether or not the predetermined condition is satisfied, and a third update unit that updates the unimodular matrix, the inverse matrix of the unimodular matrix, and the error covariance matrix based on the reduced basis when it is determined that the predetermined condition is established.

6 Claims, 14 Drawing Sheets

(56) References Cited

U.S. PATENT DOCUMENTS

| 11,641,251 | B2* | 5/2023 | Rekaya | H04J 14/04 |
| | | | | 398/25 |
| 11,689,294 | B2* | 6/2023 | Matsuda | H04B 10/69 |
| | | | | 398/208 |
| 11,770,205 | B2* | 9/2023 | Shibahara | H04B 10/2581 |
| 2020/0259544 | A1* | 8/2020 | Demmer | H04L 25/0204 |

OTHER PUBLICATIONS

J. Park et al., "Lattice reduction aided MMSE decision feedback equalizers", IEEE transactions of signal processing, vol. 59, No. 1, pp. 436-441, 2011.

Q. Zhou et al., "Element-based lattice reduction algorithms for large MIMO detection", IEEE Journal on Selected Areas in Communications, vol. 31, No. 2, pp. 274-286, 2013.

* cited by examiner

| DATABASE | HOLDING TARGET | |
|---|---|---|
| DB-1 | SEPARATION MATRIX | $W(k), \widetilde{W}(k)$ |
| DB-2 | ERROR COVARIANCE MATRIX | $\widetilde{R}_e(k)$ |
| DB-3 | UNIMODULAR MATRIX | $T(k)$ |
| | UNIMODULAR INVERSE MATRIX | $T^{inv}(k)$ |

FIG. 3

| LINE | PROCESS |
|---|---|
| 1: | $\hat{x}(k) = W^T(k)y(k)$ |
| 2: | $\tilde{\hat{x}}(k) = T^{\text{inv}}(k)\hat{x}(k)$ |
| 3: | $\tilde{x}_{\text{HD}}(k) = Q(\tilde{\hat{x}}(k), T^{\text{inv}}(k))$ |
| 4: | $x_{\text{HD}}(k) = T(k)\tilde{x}_{\text{HD}}(k)$ |
| 5: | $\epsilon(k) = x_{\text{HD}}(k) - \hat{x}(k)$ |
| 6: | $W^T(k+1) = W^T(k) + \mu\epsilon(k)y^H(k)$ |
| 7: | $\tilde{\epsilon}(k) = T^{\text{inv}}(k)\epsilon(k)$ |
| 8: | $\tilde{R}_e(k+1) = \delta\tilde{R}_e(k) + \tilde{\epsilon}(k)\tilde{\epsilon}^H(k)$ |
| 9: | if $k = 0 \pmod{K}$ |
| 10: | $\quad \lambda_{i,j}(k) = -\left\lfloor \frac{\tilde{r}_{i,j}(k)}{\tilde{r}_{j,j}(k)} \right\rceil$ |
| 11: | $\quad$ if $\sum_{i,j}|\lambda_{i,j}(k)| > N$ then |
| 12: | $\quad\quad (i,j) = \underset{i \neq j,\ i,j \in \{1,\cdots N\}}{\arg\min} \Delta_{i,j}(k)$ |
| 13: | $\quad\quad T(k) \leftarrow T(k)\Lambda_{i,j}^{\text{inv}}(k)$ |
| 14: | $\quad\quad T^{\text{inv}}(k) \leftarrow \Lambda_{i,j}(k)T^{\text{inv}}(k)$ |
| 15: | $\quad\quad \tilde{R}_e(k) \leftarrow \Lambda_{i,j}(k)\tilde{R}_e(k)\Lambda_{i,j}^H(k)$ |
| 16: | $\quad$ end |
| 17: | end |

FIG. 4

| LINE | PROCESS |
|------|---------|
| 1: | $\hat{x}(k) = W^T(k)y(k)$ |
| 2: | $\hat{\tilde{x}}(k) = T^{\text{inv}}(k)\hat{x}(k)$ |
| 3: | $\tilde{x}_{\text{HD}}(k) = Q(\hat{\tilde{x}}(k), T^{\text{inv}}(k))$ |
| 4: | $x_{\text{HD}}(k) = T(k)\tilde{x}_{\text{HD}}(k)$ |
| 5: | $\epsilon(k) = x_{\text{HD}}(k) - \hat{x}(k)$ |
| 6: | $W^T(k+1) = W^T(k) + \mu\epsilon(k)y^H(k)$ |
| 7: | $\tilde{\epsilon}(k) = T^{\text{inv}}(k)\epsilon(k)$ |
| 8: | $\tilde{R}_e(k+1) = \delta\tilde{R}_e(k) + \tilde{\epsilon}(k)\tilde{\epsilon}^H(k)$ |
| 9: | if $k = 0 \pmod K$ |
| 10: | $\lambda_{i,j}(k) = -\left\lfloor \frac{\tilde{r}_{i,j}(k)}{\tilde{r}_{j,j}(k)} \right\rceil$ |
| 11: | if $\sum_{i,j} |\lambda_{i,j}(k)| > N$ then |
| 12: | $(i,j) = \arg\min_{i\neq j,\ i,j\in\{1,\cdots N\}} \Delta_{i,j}(k)$ |
| 13: | $t_j(k) \leftarrow t_j(k) - \lambda_{i,j}(k)t_i(k)$ |
| 14: | $t^{\text{inv}(i)}(k) \leftarrow t^{\text{inv}(i)}(k) + \lambda_{i,j}(k)t^{\text{inv}(j)}(k)$ |
| 15: | $\tilde{r}_i(k) \leftarrow \tilde{r}_i(k) + \lambda_{i,j}^*(k)\tilde{r}_j(k)$ |
| 16: | $\tilde{r}^{(i)}(k) \leftarrow \tilde{r}^{(i)}(k) + \lambda_{i,j}(k)\tilde{r}^{(j)}(k)$ |
| 17: | end |
| 18: | end |

FIG. 7

| LINE | PROCESS |
|---|---|
| 1: | $\hat{\tilde{x}}(k) = \tilde{W}^T(k)y(k)$ |
| 2: | $\tilde{x}_{\text{HD}}(k) = Q(\hat{\tilde{x}}(k), T^{\text{inv}}(k))$ |
| 3: | $\tilde{\epsilon}(k) = \tilde{x}_{\text{HD}}(k) - \hat{\tilde{x}}(k)$ |
| 4: | $x_{\text{HD}}(k) = T(k)\tilde{x}_{\text{HD}}(k)$ |
| 5: | $\tilde{W}^T(k+1) = \tilde{W}^T(k) + \mu\tilde{\epsilon}(k)y^H(k)$ |
| 6: | $\tilde{R}_e(k+1) = \delta\tilde{R}_e(k) + \tilde{\epsilon}(k)\tilde{\epsilon}^H(k)$ |
| 7: | if $k = 0 \pmod{K}$ |
| 8: | $\quad \lambda_{i,j}(k) = -\left\lfloor \frac{\tilde{r}_{i,j}(k)}{\tilde{r}_{j,j}(k)} \right\rfloor$ |
| 9: | $\quad$ if $\sum_{i,j} \|\lambda_{i,j}(k)\| > N$ then |
| 10: | $\quad\quad (i,j) = \underset{i\neq j,\ i,j\in\{1,\cdots N\}}{\arg\min} \Delta_{i,j}(k)$ |
| 11: | $\quad\quad T(k) \leftarrow T(k)\Lambda_{i,j}^{\text{inv}}(k)$ |
| 12: | $\quad\quad T^{-1}(k) \leftarrow \Lambda_{i,j}(k)T^{\text{inv}}(k)$ |
| 13: | $\quad\quad \tilde{R}_e(k) \leftarrow \Lambda_{i,j}(k)\tilde{R}_e(k)\Lambda_{i,j}^H(k)$ |
| 14: | $\quad\quad \tilde{W}^T \leftarrow \Lambda_{i,j}\tilde{W}^T$ |
| 15: | $\quad$ end |
| 16: | end |

FIG. 11

| LINE | PROCESS |
|---|---|
| 1: | $\hat{\tilde{x}}(k) = \tilde{W}^T(k)y(k)$ |
| 2: | $\tilde{x}_{HD}(k) = Q(\hat{\tilde{x}}(k), T^{\text{inv}}(k))$ |
| 3: | $\tilde{\epsilon}(k) = \tilde{x}_{HD}(k) - \hat{\tilde{x}}(k)$ |
| 4: | $x_{HD}(k) = T(k)\tilde{x}_{HD}(k)$ |
| 5: | $\tilde{W}^T(k+1) = \tilde{W}^T(k) + \mu\tilde{\epsilon}(k)y^H(k)$ |
| 6: | $\tilde{R}_\epsilon(k+1) = \delta\tilde{R}_\epsilon(k) + \tilde{\epsilon}(k)\tilde{\epsilon}^H(k)$ |
| 7: | if $k = 0 \pmod{K}$ |
| 8: | $\lambda_{i,j}(k) = - \left\lfloor \frac{\tilde{r}_{i,j}(k)}{\tilde{r}_{j,j}(k)} \right\rceil$ |
| 9: | if $\sum_{i,j}|\lambda_{i,j}(k)| > N$ then |
| 10: | $(i,j) = \underset{i \neq j,\ i,j \in \{1,\cdots N\}}{\arg\min} \Delta_{i,j}(k)$ |
| 11: | $t_j(k) \leftarrow t_j(k) - \lambda_{i,j}(k)t_i(k)$ |
| 12: | $t^{\text{inv}(i)}(k) \leftarrow t^{\text{inv}(i)}(k) + \lambda_{i,j}(k)t^{\text{inv}(j)}(k)$ |
| 13: | $\tilde{r}_i(k) \leftarrow \tilde{r}_i(k) + \lambda_{i,j}^*(k)\tilde{r}_j(k)$ |
| 14: | $\tilde{r}^{(i)}(k) \leftarrow \tilde{r}^{(i)}(k) + \lambda_{i,j}(k)\tilde{r}^{(j)}(k)$ |
| 15: | $\tilde{w}_i(k) \leftarrow \tilde{w}_i(k) + \lambda_{i,j}(k)\tilde{w}_j(k)$ |
| 16: | end |
| 17: | end |

FIG. 13

SIGNAL DETECTION APPARATUS, SIGNAL DETECTION METHOD AND PROGRAM

CROSS-REFERENCE TO RELATED APPLICATIONS

This application is a 371 U.S. National Phase of International Application No. PCT/JP2020/031435, filed on Aug. 20, 2020. The entire disclosure of the above application is incorporated herein by reference.

TECHNICAL FIELD

The present invention relates to a signal detection device, a signal detection method and a program.

BACKGROUND ART

With the start of the service of the fifth generation mobile communication system (5G), the distribution service of a high definition moving image, and the development of the IoT (Internet of Things) service, the demand of the communication traffic of an optical signal is increasing. Up to now, without changing the structure of an optical fiber provided in a transmission line, an increased demand has been dealt with by improving the function of an optical communication device installed at a terminal station of an optical network, introducing an optical amplifier and an optical switch, and the like.

At present, optical fibers provided in transmission lines are fundamental to a large-capacity optical network. A single mode fiber is widely used as an optical fiber of the transmission line, except for a local network for a short distance (for example, LAN (Local Area Network)). In the single mode fiber, a single core serving as a path for an optical signal is provided in a clad of the optical fiber.

In a wavelength band used in a large capacity optical network (for example, in a C band and an L band), the single mode fiber allows only transmission of a single mode optical signal. Thus, an optical network for stably transmitting a large amount of information reaching several terabits per second over a long distance is realized.

A transmission technology (a digital coherent transmission technology) in which a digital signal processing technology and a coherent transmission/reception technology are combined is introduced into an optical communication system of 100 gigabits per second.

Information independently placed on the amplitude and phase of the optical signal transmitted using the digital coherent transmission technology is extracted from the optical signal using the coherent reception technology. Thus, not only the reception sensitivity by coherent reception is improved but also the distortion generated in the waveform of the transmitted optical signal can be corrected with high accuracy.

As a first simple example, polarization multiplexing optical transmission using two modes of polarized wave orthogonal to each other in a single mode fiber will be described.

In the polarization multiplexing optical transmission, different information can be placed on polarized waves orthogonal to each other. In the transmission line, these polarized waves are mixed complicatedly. Since the orthogonal axes of these polarized waves fluctuate at high speed, it is difficult to follow the fluctuation by using an optical device. Therefore, a reception device corresponding to the polarization diversity structure receives the multiplexing optical signal of the mixed polarized wave. The reception device converts the multiplexing optical signal of the polarized wave into a digital signal. The communication device separates the mixed polarized waves by using digital signal processing.

Such a separation processing system can be modeled as a "2×2 MIMO (Multiple-Input Multiple-Output)" system used in a wireless communication system. Information placed on polarized waves orthogonal to each other is extracted from the separated signal for each polarized wave. Thus, communication between the transmission device and the reception device is enabled.

As a second simple example, mode multiplexing optical transmission using a plurality of modes in a multimode fiber will be described.

In the mode multiplexing optical transmission, the core diameter of the multimode fiber is longer than that of the single mode fiber. Thus, a plurality of modes can be excited in a wavelength band such as a C band. Different information can be placed on the optical signals of the respective modes.

In the mode multiplexing optical transmission, the mode-multiplexed optical signal (a mode signal) transmitted through the multimode fiber are mixed complicatedly in the transmission line, similarly to the polarization multiplexing optical transmission. The reception device corresponding to the mode diversity structure receives the mixed mode multiplexing optical signal. The reception device converts the mode multiplexing optical signal into a digital signal. The reception device separates each digital signal based on the mixed mode multiplexing optical signal by using MIMO digital signal processing of a scale corresponding to the number of excited modes.

As a more specific example, a few-mode fiber, which excites two LP (Linear Polarized) (2LP) modes, will be described.

In the few-mode fiber for the 2LP mode, an "LP01 mode" to be a base mode and an "LP11 mode" to be a high-order mode are excited. Further, by utilizing "LP11a" and "LP11b" which are two degraded modes of "LP11 mode" and "X polarized wave" and "Y polarized wave" which are polarization modes of the respective modes, it is possible to place different information on each of signals of a total six special mode of "LP01X", "LP01Y", "LP11aX", "LP11aY", "LP11bX", and "LP11bY" in the few-mode fiber for the 2LP mode.

Therefore, when the nonlinear optical effect of the optical fiber is ignored, the transmission capacity of three times as large as that of the single mode fiber can be attained by the few-mode fiber for the 2 LP mode in a principle sense.

However, in mode multiplex transmission in which a multimode fiber or the few-mode fiber is used as a transmission line for an optical signal and independent information is placed on an optical signal in each spatial mode, there is a problem that a deviation in transmission characteristics for each spatial channel is large. Here, due to power loss of the optical signal transmitted through the optical fiber, power loss of the optical signal at a connection unit of the optical fiber, and deterioration of a high-order spatial mode compared to a base spatial mode, there is a case where a deviation of transmission characteristics for each spatial channel becomes large.

Such a phenomenon can be comprehensively evaluated as an influence of mode dependent loss. When the transmission characteristic of a specific spatial channel is deteriorated, it is difficult for the transmission capacity and the transmission distance to enjoy the benefit of mode multiplexing transmission.

The influence of mode dependent loss on transmission capacity and transmission distance in a linear MIMO channel will be described. In the following description, the number of modes excited in the multi-mode fiber is N (N is an integer of 1 or more). The N modes are used as a signal carrying mode. In the following description, the symbol "T" described at the shoulder of the matrix (vector) represents the transposition. A reception signal vector "y=[y1 y2 yN]T" corresponding to the transmission signal vector "x" is represented by formula (1).

[Math. 1]

$$y = Hx + n = \sum_{i=1}^{n} h_i x_i + n \quad (1)$$

Here, "x=[x1 x2 . . . xN]T" represents a transmission signal vector. "H" represents a full-rank transmission channel matrix of "N×N" size. "n=[n1 n2 . . . nN]T-" represents a noise vector.

In the formula (1), a transmission line channel matrix "H" is developed as shown by "H=[h1 h2 . . . hN]". Here, "hi(i is an integer of 1 or more and N or less)" represents a column vector. According to the formula (1), the reception signal vector "Y" is a vector obtained by adding a discrete point (lattice) in a linear space spanned by the column vector "hi" and the noise vector "n".

In the following description, symbols added above characters in a mathematical formula or a function (referred to as "mathematical expression or the like" below) are written before the characters. For example, the symbol "^" added above a character in a formula and the like is written before the character "x" below as "^x". For example, the symbol "~" added above a character in a formula and the like is written before the character "x" below as "~x".

Next, a linear detection filter will be described.

The linear detection filter detects an estimation vector "~x" of a transmission signal vector by multiplying a reception signal vector "y" by a linear weight matrix "WT". As a design criterion of such the linear weight matrix "WT", for example, maximum ratio combining, zero forcing, or minimum means squared error (MMSE) are used.

The linear detection filter designed by using maximum ratio combining exhibits good detection characteristics with respect to an estimation vector in a region of a low signal-to-noise ratio (SNR). The linear detection filter designed by using zero-forcing exhibits good detection characteristics for estimation vectors in a region of high SNR. The linear detection filter designed by using a minimum means squared error exhibits good detection characteristics compared to the linear detection filter designed by using maximum ratio combining or zero forcing.

In the following description, the linear weight matrix is expressed as "WT=[w1 w2 . . . wN]T". Here, "wi" represents the i-th column of the linear weight matrix "WT".

The linear weight matrix "wiT" is multiplied from the left to both sides of the formula (1) so that the i-th component "xi" of the transmission signal vector "x" is detected.

[Math. 2]

$$\tilde{x}_i = w_i^T y = w_i^T h_i x_i + \sum_{j=1, j \neq i}^{n} w_i^T h_j x_j + w_i^T n \quad (2)$$

Here, a second term of formula (2) represents a residual interference component. A third term of the formula (2) represents a noise component. When the orthogonality of the transmission channel matrix "H" is lost and the mode dependent loss is increased, the residual interference components and noise enhancement or the like occur. Thus, the detection accuracy of the i-th component "xi" of the transmission signal vector "x" is deteriorated.

Next, a linear detection (LD) based on Lattice reduction (LR) will be described.

The linear detection "LR-LD" based on the lattice reduction is a detection method for improving the detection accuracy of the signal. Here, the lattice reduction is to find out a basis vector (a reduced basis) which exhibits good characteristics for the basis vector which spans the given lattice from among other basis vectors which span the same lattice as that of the given lattice.

"Exhibit good characteristics" means that when the transmission channel matrix "H" has orthogonality, the lattice reduction can be applied to a signal detection method. For example, by solving a short vector problem, it is possible to find out a basis vector exhibiting good characteristics. As a method for efficiently solving the approximate solution of the short vector problem, "LLL (Lenstra-Lenstra-Lovasz) basis reduction" is known (refer to NPD 1).

However, the calculation amount required for executing "LLL base reduction" is large. If "LLL basis reduction" is executed on the transmission channel matrix "H", the required calculation amount is estimated by "0 (N4 log B)" (refer to NPD 2). Here, the maximum value "B" represents the maximum value of the L2 norm of the column vector "hi".

Further, a lattice reduction based on basic deformation in which the calculation amount is reduced is disclosed in NPD 3. Since application to a transmission channel having static characteristics is assumed in NPD 3, the lattice reduction is executed only once, and the basis vector (a system for increasing orthogonality) exhibiting good characteristics is not updated.

CITATION LIST

Non Patent Documents

[NPD 1] A. K. Lenstra et al., "Factoring polynomials with rational coefficients", Mathematische Annalen, Vol. 261, No. 4, pp. 515-534, 1982

[NPD 2] J. Park et al., "Lattice reduction aided MMSE decision feedback equalizers", IEEE transactions of signal processing, Vol. 59, No. 1, pp. 436-441, 2011

[NPD 3] Q. Zhou and X. Ma, "Element-based lattice reduction algorithms for large MIMO detection", IEEE Journal on selected Areas in Communications, Vol. 31, No. 2, pp. 274-286, 2013

SUMMARY OF INVENTION

Technical Problem

When the linear detection "LR-LD" based on the lattice reduction is applied to an optical communication system, it is necessary to use a basis reduction capable of following a transmission channel having dynamic characteristics (time variability). However, an error in information placed on an optical signal transmitted through a transmission line having time variability may not be reduced by a calculation amount (a low calculation amount) equal to or less than a predetermined threshold value.

In view of the above-mentioned circumstances, an object of the present invention is to provide a signal detection device, a signal detection method, and a program that can reduce errors in information placed on an optical signal transmitted through a transmission line having the time variability with a calculation amount equal to or less than a predetermined threshold.

Solution to Problem

An embodiment of the present invention is a signal detection device includes a signal detection unit that multiplies the reception signal vector by a separation matrix to derive an estimation vector of a transmission signal vector, a first conversion unit that converts the estimation vector of the transmission signal vector to the estimation vector of the transmission signal vector based on the reduced basis by using an inverse matrix of a unimodular matrix, a first determination unit that converts the estimation vector of the transmission signal vector based on the reduced basis to a determination value vector of the transmission signal vector by using the inverse matrix of the unimodular matrix and the unimodular matrix, a first update unit that updates the separation matrix by using a first error signal vector between the estimation vector of the transmission signal vector and the determination value vector of the transmission signal vector, a second conversion unit that converts the first error signal vector to a second error signal vector based on the reduced basis by using the inverse matrix of the unimodular matrix, a second update unit that updates an error covariance matrix based on the reduced basis by using the second error signal vector based on the reduced basis, a second determination unit that determines whether or not a predetermined condition is satisfied, and a third update unit that updates the unimodular matrix, the inverse matrix of the unimodular matrix, and the error covariance matrix based on the reduced basis when it is determined that the predetermined condition is satisfied.

The aspect of the present invention is the signal detection device includes the signal detection unit that multiplies the reception signal vector by the separation matrix based on a reduced basis to derive the estimation vector of the transmission signal vector based on the reduced basis, the first determination unit that derives the determination value vector of the transmission signal vector based on the reduced basis by using the inverse matrix of the unimodular matrix and derives the determination value vector of the transmission signal vector by using the determination value vector of the estimation vector of the transmission signal vector based on the reduced basis, and the unimodular matrix, an error derivation unit that derives an error signal vector between the determination value vector of the transmission signal vector based on the reduced basis and the estimation vector of the transmission signal vector based on the reduced basis as an error signal vector based on the reduced basis, the first update unit that updates the separation matrix based on the reduced basis using the error signal vector based on the reduced basis, the second update unit that updates the error covariance matrix based on the reduced basis by using the error signal vector based on the reduced basis, the second determination unit that determines whether or not the predetermined condition is satisfied, and the third update unit that updates the unimodular matrix, the inverse matrix of the unimodular matrix, the error covariance matrix based on the reduced basis and the separation matrix based on the reduced basis when it is determined that the predetermined condition is satisfied.

The aspect of the present invention is a signal detection method executed by the signal detection device, the signal detection method includes a signal detection step for multiplying the reception signal vector by the separation matrix to derive the estimation vector of the transmission signal vector, a first conversion step for converting the estimation vector of the transmission signal vector to the estimation vector of the transmission signal vector based on the reduced basis by using the inverse matrix of the unimodular matrix, a first determination step for converting the estimation vector of the transmission signal vector based on the reduced basis to the determination value vector of the transmission signal vector by using the inverse matrix of the unimodular matrix and the unimodular matrix, a first update step for updating the separation matrix by using the first error signal vector between the estimation vector of the transmission signal vector and the determination value vector of the transmission signal vector, a second conversion step for converting the first error signal vector to the second error signal vector based on the reduced basis by using the inverse matrix of the unimodular matrix, a second update step for updating the error covariance matrix based on the reduced basis by using the second error signal vector based on the reduced basis, a second determination step for determining whether or not the predetermined condition is satisfied, and a third update step for updating the unimodular matrix, the inverse matrix of the unimodular matrix, and the error covariance matrix based on the reduced basis when it is determined that the predetermined condition is satisfied.

The aspect of the present invention is the signal detection method executed by the signal detection device, the signal detection method includes the signal detection step for multiplying the reception signal vector by the separation matrix based on a reduced basis to derive the estimation vector of the transmission signal vector based on the reduced basis, the first determination step for deriving the determination value vector of the transmission signal vector based on the reduced basis by using the inverse matrix of the unimodular matrix and deriving the determination value vector of the transmission signal vector by using the determination value vector of the estimation vector of the transmission signal vector based on the reduced basis, and the unimodular matrix, an error derivation step for deriving an error signal vector between the determination value vector of the transmission signal vector based on the reduced basis and the estimation vector of the transmission signal vector based on the reduced basis as an error signal vector based on the reduced basis, the first update step for updating the separation matrix based on the reduced basis using the error signal vector based on the reduced basis, the second update step for updating the error covariance matrix based on the reduced basis by using the error signal vector based on the reduced basis, the second determination step for determining whether or not the predetermined condition is satisfied, and the third update step for updating the unimodular matrix, the inverse matrix of the unimodular matrix, the error covariance matrix based on the reduced basis and the separation matrix based on the reduced basis when it is determined that the predetermined condition is satisfied.

The aspect of the present invention is a program for causing a computer to function as the signal detection device described above.

Advantageous Effects of Invention

According to the present invention, it is possible to reduce the error in information placed on the optical signal transmitted through the transmission line having the time variability with the calculation amount equal to or less than the predetermined threshold.

BRIEF DESCRIPTION OF DRAWINGS

FIG. 3 is a diagram illustrating an example of a storage target of each database according to the first embodiment.

FIG. 4 is a diagram illustrating an algorithm example of an operation of the signal detection device according to the first embodiment.

FIG. 7 is a diagram illustrating an algorithm example of an operation of the signal detection device according to the second embodiment.

FIG. 11 is a diagram illustrating an algorithm example of an operation of the signal detection device according to the third embodiment.

FIG. 13 is a diagram illustrating an algorithm example of an operation of the signal detection device according to the fourth embodiment.

DESCRIPTION OF EMBODIMENTS

Embodiments of the present invention will be described in detail with reference to the drawings.

First Embodiment

Figure 1:
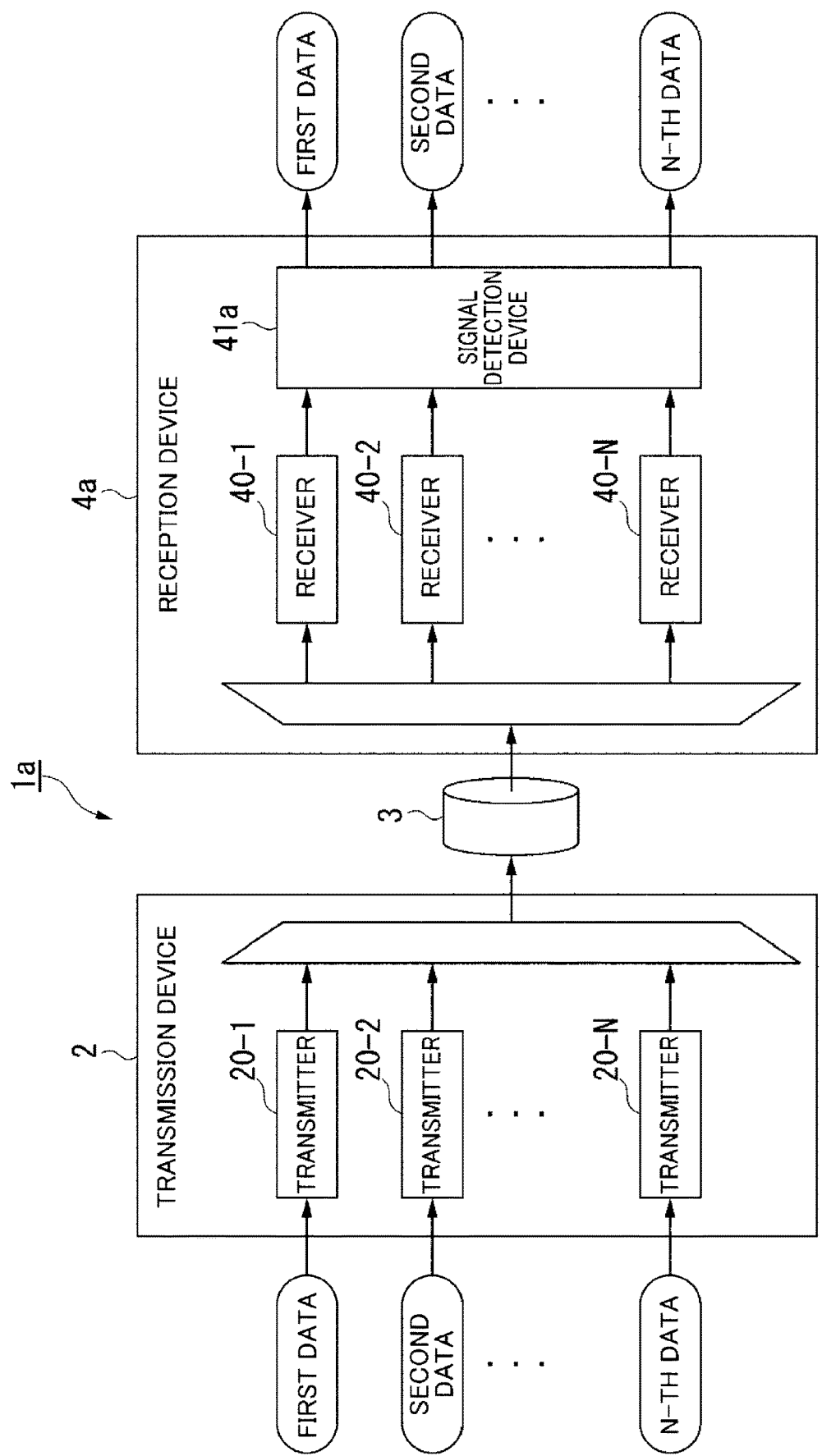
FIG. 1 is a diagram illustrating a configuration example of an optical communication system according to a first embodiment.

FIG. 1 is a diagram illustrating a configuration example of an optical communication system 1a. The communication system 1a includes a transmission device 2, a multimode fiber 3, and a reception device unit 4a. The transmission unit 2 includes N transmitters 20 as a transmitter of each mode. The reception device unit 4a includes N receivers 40 as a receiver of each mode. In addition, the reception device 4a includes a signal detection device 41a (signal detection apparatus) (a MIMO signal detection unit).

The optical communication system 1a is a system for performing communication using optical signals. Hereinafter, independent information sequences are referred to as "data sequences". The communication system 1a transmits N data sequences (transmission signal vectors) from the transmission device 2 toward the reception device 4a.

The transmitter 20-1 to 20-N encodes the N data sequences into N electric signals. The transmitter 20-1 to 20-N converts the electric signals of N data sequences into optical signals of N data sequences. The multimode fiber 3 transmits the optical signals of the N data series to the reception device 4a as optical signals of each spatial mode.

The receiver 40-1 to 40-N receives the optical signals of the transmitted N data sequences. The receiver 40-1 to 40-N converts the optical signals of the N data sequences into electric signals (reception signal vectors) of the N data sequences. The signal detection device 41a removes distortion or the like generated in the waveform from the electric signals of the N data sequences by a digital signal processing. The signal detection device 41a corrects an error generated in each data sequences through transmission by the digital signal processing. Thus, the separation of N original data sequences (transmission signal vectors) and the extraction of N data sequences (reception signal vectors) are made possible.

Next, a signal separation processing in the signal detection device 41a will be described.

Hereinafter, an inverse matrix derived without performing an inverse matrix operation for the matrix "A" is referred to as "Ainv". As a result, the inverse matrix "A−1" derived by executing the operation of the inverse matrix and the inverse matrix "Ainv" are distinguished from each other.

Hereinafter, a system which is transformed by using a unimodular matrix "T(k)" or the unimodular inverse matrix "Tinv(k)" (basis) and which enhances orthogonality of the transmission channel matrix "H" (reduced basis) is referred to as "LR domain". The unimodular matrix is a matrix in which each component is an integer, and an absolute value of a matrix expression is 1.

Figure 2:
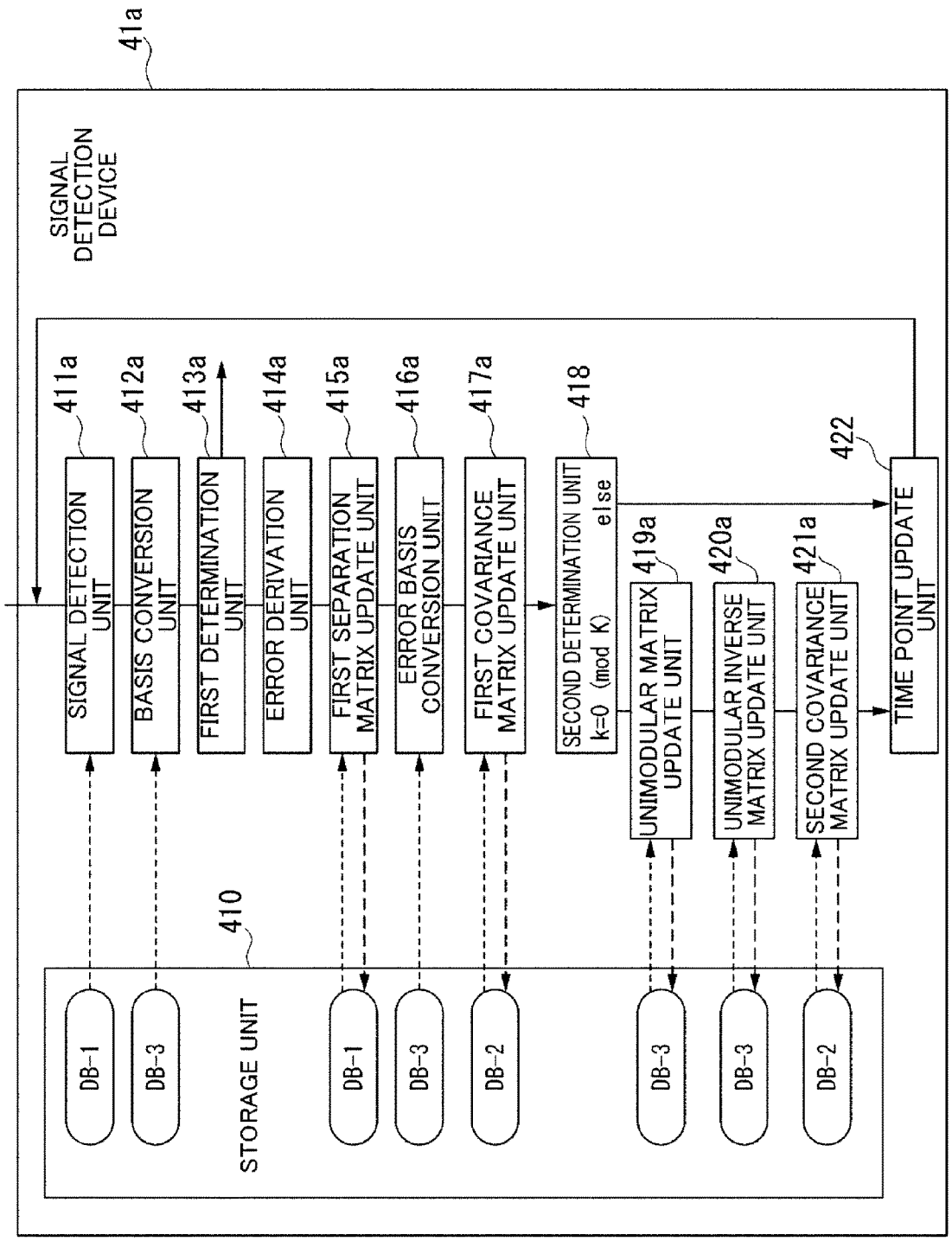
FIG. 2 is a diagram illustrating a configuration example of the signal detection device according to the first embodiment.

FIG. 2 is a diagram illustrating a configuration example of the signal detection device 41a (a MIMO signal detection unit). The signal detection device 41a includes a storage unit 410, a signal detection unit 411a, a basis conversion unit 412a, a first determination unit 413a, an error derivation unit 414a, a separation matrix update unit 415a, an error basis conversion unit 416a, a first covariance matrix update unit 417a, a second determination unit 418, a unimodular matrix update unit 419a, a unimodular inverse matrix update unit 420a, a second covariance matrix update unit 421a, and a time point update unit 422.

In the following description, characters representing vectors or matrices based on the LR domain are described by attaching a tilde "~" to the front of the characters.

FIG. 3 is a diagram illustrating an example of the storage target for each database. The storage unit 410 holds a database "DB-1", a database "DB-2", and a database "DB-3". The targets held in the database "DB-1" are the separation matrices "W(k)" with respect to a sampling time point "k (k is an integer of 1 or more)" and the separation matrices "~W(k)" based on the LR domain. The targets held in the database "DB-2" are the error covariance matrices "~Re(k)" based on the LR domain with respect to the sampling time point "k". The targets held in the database "DB-3" are the unimodular matrices "T(k)" and the unimodular inverse matrix "Tinv(k)" with respect to the sampling time point "k".

The signal detection unit 411a executes the sampling processing to the electric signal (the reception signal) inputted from the receiver 40-1 to 40-N. Thus, the signal detection unit 411a detects the inputted electric signals (the reception signal vectors). At the sampling time point "k", the estimation vector "x(k)" of the transmission signal vector "x" is represented by formula (3).

[Math. 3]

$$\hat{x}(k) = W^T(k) y(k) \quad (3)$$

Here, "W(k)" represents the separation matrix (the signal separation matrix).

The basis conversion unit 412a converts the estimation vector "^x(k)" of the transmission signal vector to the estimation vector "^~x(k)" of the transmission signal vector based on the LR domain, as shown in formula (4), using the unimodular inverse matrix "Tinv(k)" of the transmission signal vector based on the LR domain.

[Math. 4]

$$\tilde{\hat{x}}(k) = T^{inv}(k) \hat{x}(k) \quad (4)$$

The first determination unit 413a determines a signal in the LR domain (the system that increases orthogonality of the transmission channel matrix "H") by using the estimation vector "^~x(k)" of the transmission signal vector based on the LR domain. That is, the first determination unit 413a derives the sampling value (the determination value vector) of the transmission signal vector (each data sequence from the first date to the N-th data) with respect to the estimation vector of the transmission signal vector based on the LR domain. The first determination unit 413a outputs the determination value vector (the output signal) to a predetermined device (not shown).

For example, the first determination unit 413a derives the determination value vector "xHD" of the transmission signal vector, as shown by formula (5), by using the unimodular matrix "T(k)".

[Math. 5]

$$x_{HD}(k) = T(k) Q(\tilde{\hat{x}}(k), T^{inv}(k)) \quad (5)$$

Here, "Q(•)" represents a signal determination function. When the signal format is a QAM signal, for example, the signal determination function "Q(•)" is represented by formula (6) by using a given vector "a" and the unimodular inverse matrix "Tinv(k)".

[Math. 6]

$$Q(a, T^{inv}) = 2 \left[ \frac{a - (1+j) T^{inv} 1_{N \times 1}}{2} \right] + (1+j) T^{inv} 1_{N \times 1} \quad (6)$$

Here, for the in-phase component and the orthogonal component, the Euclidean distance between the respective symbol points is 2. Further, "1N×1" represents a column vector of "N×1" size. All components of "1N×1" are 1. The symbol surrounding the fraction in the first term of the formula (6) represents the rounding processing. The error derivation unit 414a derives the error signal vector by formula (7).

[Math. 7]

$$\in(k) = x_{HD}(k) - \hat{x}(k) \quad (7)$$

The separation matrix update unit 415a updates the separation matrix "WT(k)". For example, the separation matrix update unit 415a derives the separation matrix "WT(k+1)" by formula (8), so as to reduce an error by sequentially using the LMS (Least mean square) method.

[Math. 8]

$$W^T(k+1) = W^T(k) + \mu \in (k) y^H(k) \quad (8)$$

Here, "μ" is a parameter representing a step size.

The error basis conversion unit 416a converts the error signal vector shown in the formula (7) to the error signal vector based on the LR domain, as shown in the formula (9). That is, the error basis conversion unit 416a multiplies the error signal vector shown in the formula (7) by the unimodular inverse matrix "Tinv(k)" from the left as shown in formula (9).

[Math. 9]

$$\tilde{\in}(k) = T^{inv}(k) \in (k) \quad 9)$$

The first covariance matrix update unit 417a updates the error covariance matrix "~Re(k)" based on the LR domain, as shown in formula (10).

[Math. 10]

$$\tilde{R}_e(k+1) = \delta \tilde{R}_e(k) + \tilde{\in}(k) \tilde{\in}^H(k) \quad (10)$$

Here, "δ" is a forgetting coefficient. In the following, "δ" is an arbitrary real number of 0 or more and 1 or less.

The second determination unit 418 determines whether or not the sampling time point "k" is divisible by a predetermined number of times (a natural number) "K". When it is determined that the sampling time point "k" is divisible by the predetermined number of times "K", the unimodular matrix "T(k)", the unimodular inverse matrix "Tinv(k)", and the error covariance matrix "~Re(k)" based on the LR domain are updated.

Next, the update of the unimodular matrix "T(k)", the update of the unimodular inverse matrix "Tinv(k)", and the update of the error covariance matrix "~Re(k)" based on the LR domain will be described.

When it is determined that the sampling time point "k" is divisible by the predetermined number of times "K", these matrices are updated by execution of replacement processing. When the predetermined number of times "K" is 1, these matrices are updated every sampling time point "k".

The unimodular matrix update unit 419a derives an integer "λi, j(k)" as shown in formula (11).

[Math. 11]

$$\lambda_{i,j}(k) = - \left[ \frac{\tilde{r}_{i,j}(k)}{\tilde{r}_{j,j}(k)} \right] \quad (11)$$

Here, "~ri, j(k)" represents the (i, j) component of the error covariance matrix "~Re(k)" based on the LR domain. Therefore, in the pair of (i, j) in which "i=j" is satisfied, the value of "λi, j(k)" is "−1".

When the value of the integer "λi, j(k)" is "other than 0" in any pair of (i, j) in which "i≠j" is satisfied, the unimodular matrix "T(k)", the unimodular inverse matrix "Tinv(k)", and the error covariance matrix "~Re(k)" (a related statistical amount) based on the LR domain are updated to be capable of detecting the signal on the LR domain.

The condition in which the value of the integer "λi, j(k)" is "other than 0" in any pair of (i, j) that satisfies "i≠j" can be read to the condition a sum of an absolute values of the integer "λi, j(k)" for all of (i, j) pair is more than a number of modes "N".

The unimodular matrix update unit 419a selects a pair of (i, j) which minimizes "Δi, j(k)" as the specified pair among pairs of (i, j) that satisfies "i≠j", as shown in formula (12).

[Math. 12]

$$(i,j) = \arg\min \Delta_{i,j}(k) \quad (12)$$

Here, "Δi, j" (k)" is represented as shown in formula (13).

[Math. 13]

$$\Delta_{i,j}(k) = \lambda_{i,j}(k)\tilde{r}_{i,j}(k) + \Delta_{i,j}^*(k)\tilde{r}_{i,j}(k) + |\lambda_{i,j}(k)|^2 \tilde{r}_{j,j}(k) \quad (13)$$

The process of selecting the pair of (i, j) which minimizes "Δi, j(k)" corresponds to the processing to select a pair of (i, j) which minimizes a root mean square error between on output signal and a desired signal.

Furthermore, when it is determined that the sum of the absolute values of the integer "λi, j(k)" for all of (i, j) pair is more than the number of modes "N", each processing shown in formula (14) to (18) is performed to reduce the calculation amount once, for example.

A matrix "Λi, j(k)" having the "λi, j(k)" for (I, j) component, 1 for diagonal components, 0 for other than components is represented as shown in formula (14).

[Math. 14]

$$\Lambda_{i,j}(k) = I + \lambda_{i,j}(k) e_i e_j^H \quad (14)$$

Here, "ep" represents a column vector of "N×1" size. The p-th component in "ep" is 1. The other components in "ep" are 0. "p" is a natural number equal to or larger than N.

The unimodular matrix update unit 419a derives an inverse matrix "Λi, jinv(k)" without executing the operation of the inverse matrix, as shown in formula (15).

[Math. 15]

$$\Lambda_{i,j}^{inv}(k) = I - \lambda_{i,j}(k) e_i e_j^H \quad (15)$$

Here, "Λi, jinv(k)" represents the inverse matrix "Λi, j−1(k)" of the matrix "Λi, j(k)".

The unimodular matrix update unit 419a updates the unimodular matrix "T(k)" matrix based the integer "Λi, j(k)" shown in the formula (14) and the integer "Λi, jinv(k)" shown in the formula (15), as shown in formula (16).

[Math. 16]

$$T(k) \leftarrow T(k)\Lambda_{i,j}^{inv}(k) \quad (16)$$

In the following description, the symbol "←" described in the formula represents the replacement processing. The unimodular inverse matrix update unit 420a updates the unimodular inverse matrix "Tinv(k)" as shown in formula (17).

[Math. 17]

$$T^{inv}(k) \leftarrow \Lambda_{i,j}(k) T^{inv}(k) \quad (17)$$

The second covariance matrix update unit 421a updates the error covariance matrix "~Re(k)" based on the LR domain as shown in formula (18).

[Math. 18]

$$\tilde{R}_e(k) \leftarrow \Lambda_{i,j}(k) \tilde{R}_e(k) \Lambda_{i,j}^H(k) \quad (18)$$

The time point update unit 422 updates the sampling time point to "k+1". At the sampling time point "k+1", the signal detection device 41a executes the same processing as that executed at the sampling time point "k".

Next, operation example of the signal detection device 41a will be described.

FIG. 4 is a diagram illustrating an algorithm example of an operation of the signal detection device 41a. As shown in a first line, the signal detection unit 411a detects the estimation vector of the inputted electric signals (the reception signal vector) as shown in the formula (3). As shown in a second line, the basis conversion unit 412a uses the unimodular inverse matrix "Tinv(k)" to convert the estimation vector "^x(k)" to the estimation vector of the transmission signal vector based on the LR domain "^~x(k)", as shown in formula (4).

As shown in a third line and a fourth line, the first determination unit 413a derives the determination value vector of a transmission signal vector "xHD" shown in the formula (5) by using the unimodular matrix "T(k)". As shown in a fifth line, the error derivation unit 414a derives the error signal vector as shown in the formula (7). As shown in a sixth line, the separation matrix update unit 415a derives the separation matrix "WT(k+1)" as shown in formula (8).

As shown in a seventh line, the error basis conversion unit 416a multiplies the error signal vector shown in the formula (7) by the unimodular inverse matrix "Tinv(k)" from the left as shown in the formula (9). As shown in a eighth line, the first covariance matrix update unit 417a updates the error covariance matrix "~Re(k)" based on the LR domain, as shown in the formula (10).

As shown in a ninth line, the second determination unit 418 determines whether or not the sampling time point "k" is divisible by the predetermined number of times (a natural number) "K". When it is determined that the sampling time point "k" is divisible by the predetermined number of times "K", the unimodular matrix update unit 419a as shown in a tenth line, derives an integer "λi, j(k)" as shown in formula (11).

As shown in an eleventh line, the unimodular matrix update unit 419a determines whether or not the sum of absolute values of the integer "λi, j(k)" for all of the pair of (i, j) is more than the number of modes "N". When it is determined that the sum of the absolute values is more than the number of modes "N", as shown in a twelfth line, the unimodular matrix update unit 419a selects a pair of (i, j) which minimizes "Δ$_{i,j}$(k)" as the specific pair among pairs of (i, j) in which "i≠j" is satisfied in the formula (12).

As shown in a thirteenth line, the unimodular matrix update unit 419a updates the unimodular matrix "T(k)" based on the integer "Λi, j(k)" and the integer "Λi, jinv(k)" as shown in the formula (16). As shown in a fourteenth line, the unimodular inverse matrix update unit 420a updates the unimodular inverse matrix "Tinv(k)" as shown in the formula (17). As shown in a fifteenth line, the second covariance matrix update unit 421a updates the error covariance matrix "~Re(k)" based on the LR domain as shown in formula (18).

Figure 5:
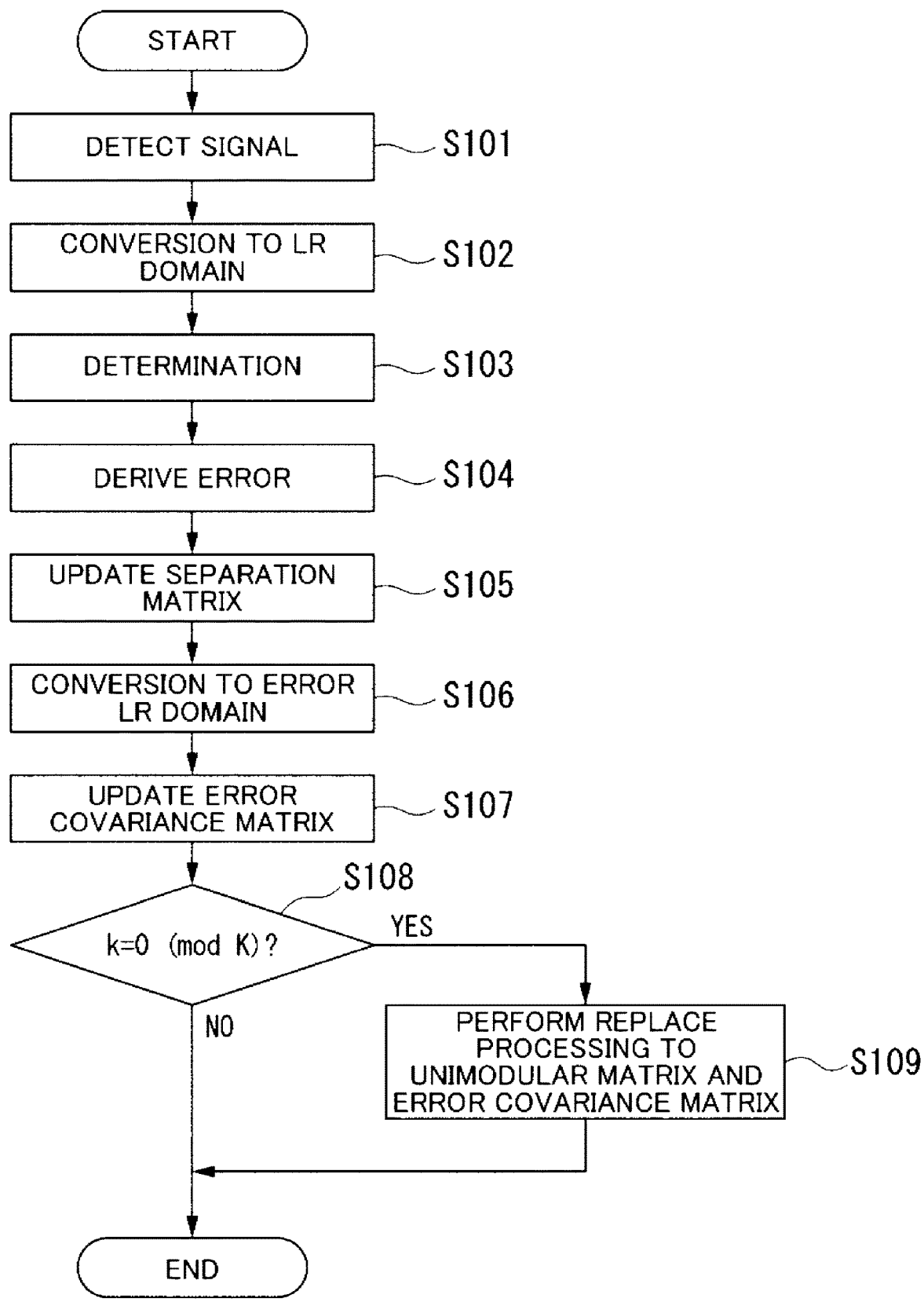
FIG. 5 is a flowchart illustrating an operation example of the signal detection device according to the first embodiment.

FIG. 5 is a flowchart illustrating an operation example of the signal detection device 41a. The operation of the flow chart illustrated in FIG. 5 is started every sampling time point "k". The signal detection unit 411a detects the estimation vector of the inputted electric signals (reception signal vectors) as shown in the formula (3) (a step S101).

The basis conversion unit 412a converts the estimation vector "^x(k)" to the estimation vector of the transmission signal vector based on the LR domain "^~x(k)" as shown in the formula (4) by using the unimodular inverse matrix "Tinv(k)" (a step S102).

The first determination unit 413a determines the signal in the LR domain as shown in the formula (5) by using the estimation vector "^~x(k)" of the transmission signal vector based on the LR domain (a step S103). The error derivation unit 414a derives the error signal vector as shown in the formula (7) (a step S104). The separation matrix update unit 415a updates the separation matrix "WT(k)" as shown in the formula (8) (a step S105).

The error basis conversion unit 416a converts the error signal vector to the error signal vector based on the LR domain as shown in the formula (9) (a step S106). The first covariance matrix update unit 417a updates the error covariance matrix "~Re(k)" based on the LR domain, as shown in the formula (10) (a step S107). The second determination unit 418 determines whether or not the sampling time point "k" is divisible by the predetermined number of times "K" (a step S108).

When it is determined that the sampling time point "k" is divisible by the predetermined number of times "K" (the step S108: YES), the unimodular matrix update unit 419a updates the unimodular matrix "T(k)" based on the integer "λi, j(k)" and the integer "Λi, jinv(k)" as shown in the formula (16). The unimodular inverse matrix update unit 420a updates the unimodular inverse matrix "Tinv(k)" as shown in the formula (17). The second covariance matrix update unit 421a updates the error covariance matrix "~Re (k)" based on the LR domain as shown in the formula (18). The time point update unit 422 updates the sampling time point to "k+1". With respect to the sampling time point "k", the signal detection device 41a ends the operation of the flow chart shown in FIG. 5.

When it is determined that the sampling time point "k" is not divisible by the predetermined number of times "K" (the step S108: No), the time point update unit 422 updates the sampling time point to "k+1". With respect to the sampling time point "k", the signal detection device 41a ends the operation of the flow chart shown in FIG. 5.

As described above, the signal detection unit 411a (signal detector) multiplies the reception signal vector "y" by the separation matrix "W" to derive the estimation vector "^x" of the transmission signal vector "x" corresponding to the reception signal vector. The basis conversion unit 412a (the first conversion unit) (first converter) converts the estimation vector "^x" of the transmission signal vector to the estimation vector "^~x" of the transmission signal vector based on an LR domain (reduced basis) by using the inverse matrix of the unimodular matrix "Tinv". The first determination unit 413a converts the estimation vector "^~x" of a transmission signal vector based on the LR domain to the determination value vector "xHD" of the transmission signal vector by using the inverse matrix of the unimodular matrix "Tinv" and the unimodular matrix "T".

The separation matrix update unit 415a (the first update unit) (first updater) updates the separation matrix "W" by using the first error signal vector between the estimation vector "^x" of the transmission signal vector and the determination value vector "xHD" of the transmission signal vector. The error basis conversion unit 416a (the second conversion unit) (second converter) converts the first error signal vector to the second error signal vector based on the LR domain, as shown in the formula (9), by using the inverse matrix of the unimodular matrix "Tinv". The first covariance matrix update unit 417a (the second update unit) (second updater) update the error covariance matrix "~Re" based on the LR domain by using the second error signal vector based on the LR domain.

The second determination unit 418 (second determiner) determines whether or not the predetermined condition is satisfied. This predetermined condition is, for example, the condition that the sampling time point "k" is divisible by the predetermined number of times "K" and the sum of the absolute values of the integer "λi, j(k)" for all of the pair of (l, j) is more than the number of modes "N".

The unimodular matrix update unit 419a (the third update unit) updates the unimodular matrix "T" when it is determined that the predetermined condition is satisfied. The unimodular inverse matrix update unit 420a (the third update unit) (third updater) updates the inverse matrix of the unimodular matrix "Tinv" when it is determined that the predetermined condition is satisfied. The second covariance matrix update unit 421a (the third update unit) updates the error covariance matrix "~Re" based on the LR domain when it is determined that the predetermined condition is satisfied.

Thus, it is possible to reduce the error of the information placed on the optical signal transmitted through the transmission line having the time variability with the calculation amount equal to or less than the predetermined threshold.

Second Embodiment

In a second embodiment,
a point where the unimodular matrix, the unimodular inverse matrix, and the error covariance matrix based on the LR domain are updated without using the respective formulas from the formulas (16) to (18) is different from the first embodiment. For the second embodiment, the differences from the first embodiment will be mainly described.

The configuration of the communication system according to the second embodiment is the same as that of the communication system 1a according to the first embodiment. That is, the communication system of the second embodiment includes the transmission device 2, the multimode fiber 3, and the reception device.

Figure 6:
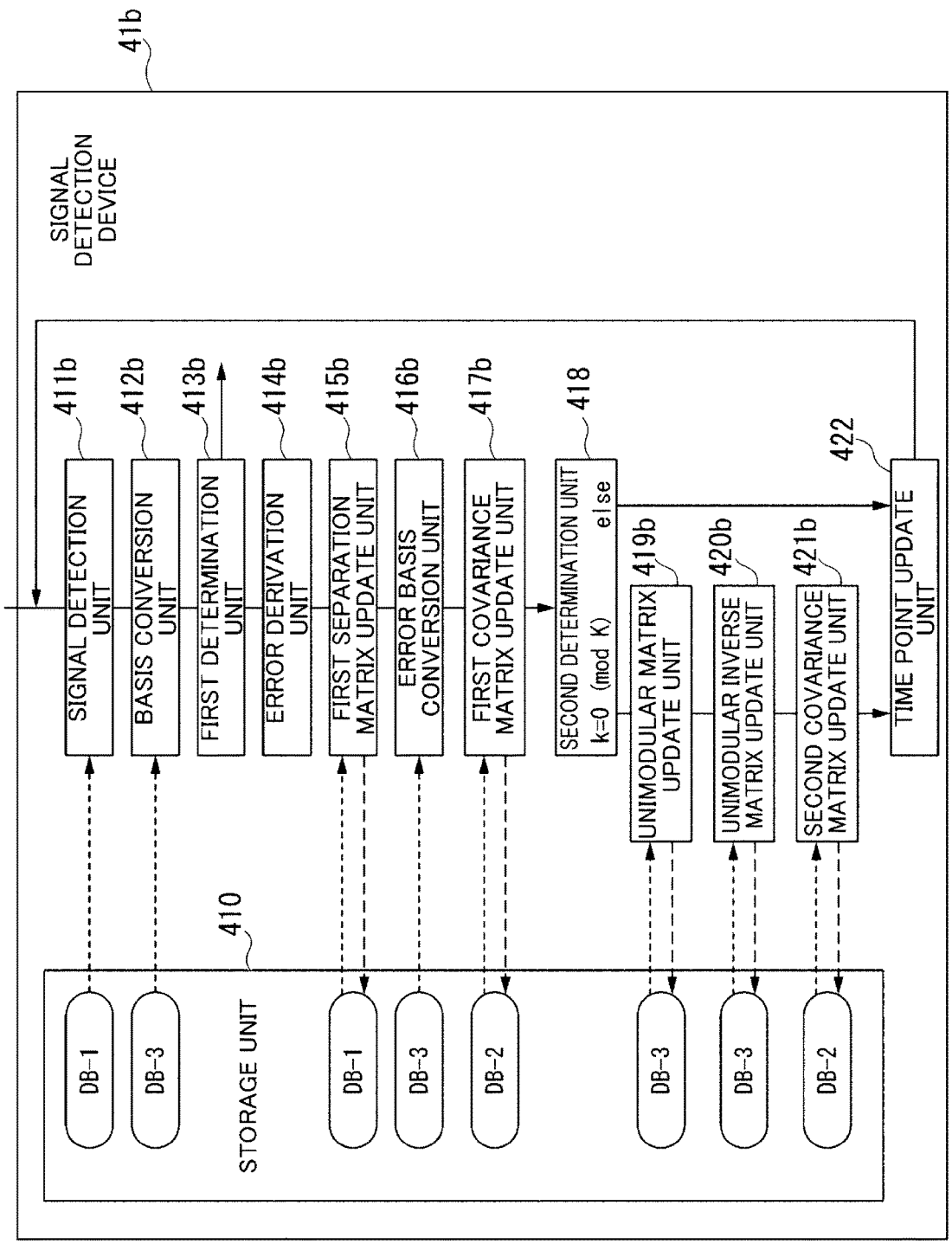
FIG. 6 is a diagram illustrating a configuration example of the signal detection device according to the second embodiment.

FIG. 6 is a diagram illustrating a configuration example of a signal detection device 41b (signal detection apparatus) (a MIMO signal detection unit). The signal detection device 41b is provided in the reception device. The signal detection device 41b includes a storage unit 410, a signal detection unit 411b, a basis conversion unit 412b, a first determination unit 413b, an error derivation unit 414b, a separation matrix update unit 415b, an error basis conversion unit 416b, a first covariance matrix update unit 417b, a second determination unit 418, a unimodular matrix update unit 419b, a unimodular inverse matrix update unit 420b, a second covariance matrix update unit 421b, and the time point update unit 422.

The signal detection device 41 b updates the unimodular matrix "T(k)", the unimodular inverse matrix "Tinv(k)", and the error covariance matrix "~Re(k)" based on the LR domain without using each matrix operation shown from the formulas (16) to (18) in the first embodiment. That is, the signal detection device 41b updates the unimodular matrix "T(k)", the unimodular inverse matrix "Tinv(k)", and the error covariance matrix "~Re(k)" based on the LR domain by using the row basic deformation or the column basic deformation of the matrix. This makes it possible to reduce the calculation amount as compared with the calculation amount in the first embodiment.

The unimodular matrix update unit 419b updates the unimodular matrix "T(k)" as shown in equation (19).

[Math. 19]

$$t_i(k) \leftarrow t_i(k) - \lambda_{i,j}(k) t_j(k) \quad (19)$$

Here, "ti" represents the i-th column of the unimodular matrix "T(k)".

The unimodular inverse matrix update unit 420b updates the unimodular inverse matrix "Tinv(k)" as shown in formula (20).

[Math. 20]

$$t^{inv(i)}(k) \leftarrow t^{inv(i)}(k) + \lambda_{i,j}(k) t^{inv(i)}(k) \quad (20)$$

Here, "tiny (i)" represents the i-th row of the unimodular inverse matrix "Tinv(k)".

The second covariance matrix update unit 421b updates the error covariance matrix "~Re(k)" based on the LR domain, using the row basic deformation as shown in formula (21).

[Math. 21]

$$\tilde{r}_i(k) \leftarrow \tilde{r}_i(k) + \lambda_{i,j}{}^*(k)\tilde{r}_j(k) \quad (21)$$

Here, "~ri(k)" represents the i-th column of the error covariance matrix "~Re(k)" based on the LR domain. "~rj (k)" represents the j-th column of the error covariance matrix "~Re(k)" based on the LR domain.

The second covariance matrix update unit 421b updates the error covariance matrix "~Re(k)" based on the LR domain, using the column basic deformation as shown in formula (22).

[Math. 22]

$$\tilde{r}^{(i)}(k) \leftarrow \tilde{r}^{(i)}(k) + \lambda_{i,j}(k)\tilde{r}^{(j)}(k) \quad (22)$$

Here, "~r(i)(k)" represents the i-th row of the error covariance matrix "~Re(k)" based on the LR domain. "~r(j)(k)" represents the j-th row of the error covariance matrix "~Re(k)" based on the LR domain.

Next, operation example of the signal detection device 41b will be described.

FIG. 7 is a diagram illustrating an algorithm example of an operation of the signal detection device 41b. The operations shown in the first to twelfth lines in FIG. 7 are the same as those shown in the first to twelfth lines in FIG. 4.

As shown in a thirteenth line, the unimodular matrix update unit 419b updates the unimodular matrix "T(k)" as shown in the formula (19). As shown in a fourteenth line, the unimodular inverse matrix update unit 420b updates the unimodular inverse matrix "Tinv(k)" as shown in the formula (20).

As shown in a fifteenth line, the second covariance matrix update unit 421b updates the j-th column "~rj(k)" of the error covariance matrix "~Re(k)" based on the LR domain, as shown in formula (21). As shown in a sixteenth line, the second covariance matrix update unit 421b updates the i-th row "~ri(k)" of the error covariance matrix "~Re(k)" based on the LR domain, as shown in formula (22).

As described above, the signal detection unit 411b multiplies the reception signal vector "y" by the separation matrix "W" to derive the estimation vector "^x" of the transmission signal vector "x" corresponding to the reception signal vector. The basis conversion unit 412b (the first conversion unit), by using the inverse matrix "Tiny" of the inverse matrix of the unimodular matrix, converts the estimation vector "^x" of the transmission signal vector to the estimation vector "^~x" of the transmission signal vector based on the LR domain (reduced basis). The first determination unit 413b converts the estimation vector "^~x" of the transmission signal vector based on the LR domain to the determination value vector "xHD" of the transmission signal vector by using the inverse matrix "Tiny" of the unimodular matrix and the unimodular matrix "T".

The separation matrix update unit 415b (the first update unit) updates the separation matrix "W" by using the first error signal vector between the estimation vector "^x" of the transmission signal vector and the determination value vector "xHD" of the transmission signal vector. The error basis conversion unit 416b (the second conversion unit) converts the first error signal vector to the second error signal vector based on the LR domain by using the inverse matrix "Tiny" of the unimodular matrix as shown in the formula (9). The first covariance matrix update unit 417b (the second update unit) updates the error covariance matrix "~Re" based on the LR domain by using the second error signal vector based on the LR domain.

The second determination unit 418 determines whether or not the predetermined condition is satisfied. The unimodular matrix update unit 419b (the third update unit) updates the unimodular matrix "T" when it is determined that the predetermined condition is satisfied. The unimodular inverse matrix update unit 420b (the third update unit) updates the inverse matrix "Tiny" of the unimodular matrix when it is determined that the predetermined condition is satisfied. The second covariance matrix update unit 421b (the third update unit) updates the error covariance matrix "~Re" based on the LR domain when it is determined that the predetermined condition is satisfied.

Thus, it is possible to reduce the error of the information placed on the optical signal transmitted through the transmission line having the time variability with the calculation amount equal to or less than the predetermined threshold.

Next, an effect example (a simulation result of the two data sequences transmitted with the mode multiplexing) of the operation of the signal detection device 41b will be described.

The transmission device 2 modulates bit strings of a data sequences (transmission signal vectors) to be transmitted as the mode multiplexing signal as 16QAM signals. The mode dependent loss of the transmission channel is, for example, 20 dB. In the transmission channel, the mode multiplexing signals are mixed with each other. Therefore, the signal detector 41b separates the mode multiplexing signal by using the digital signal processing.

The signal detection device 41b executes a detection processing based on maximum likelihood (ML) decoding, a linear detection processing based on minimum mean squared error (MMSE), and a MIMO signal detection processing based on lattice reduction (LR) as separation detection methods for comparing accuracy with each other.

The detection processing based on the maximum likelihood decoding is known as an optimal decoding method in the case where prior knowledge about the frequency of signal generation cannot be obtained. However, the calculation amount required for the detection processing based on the maximum likelihood decoding is very large.

Figure 8:
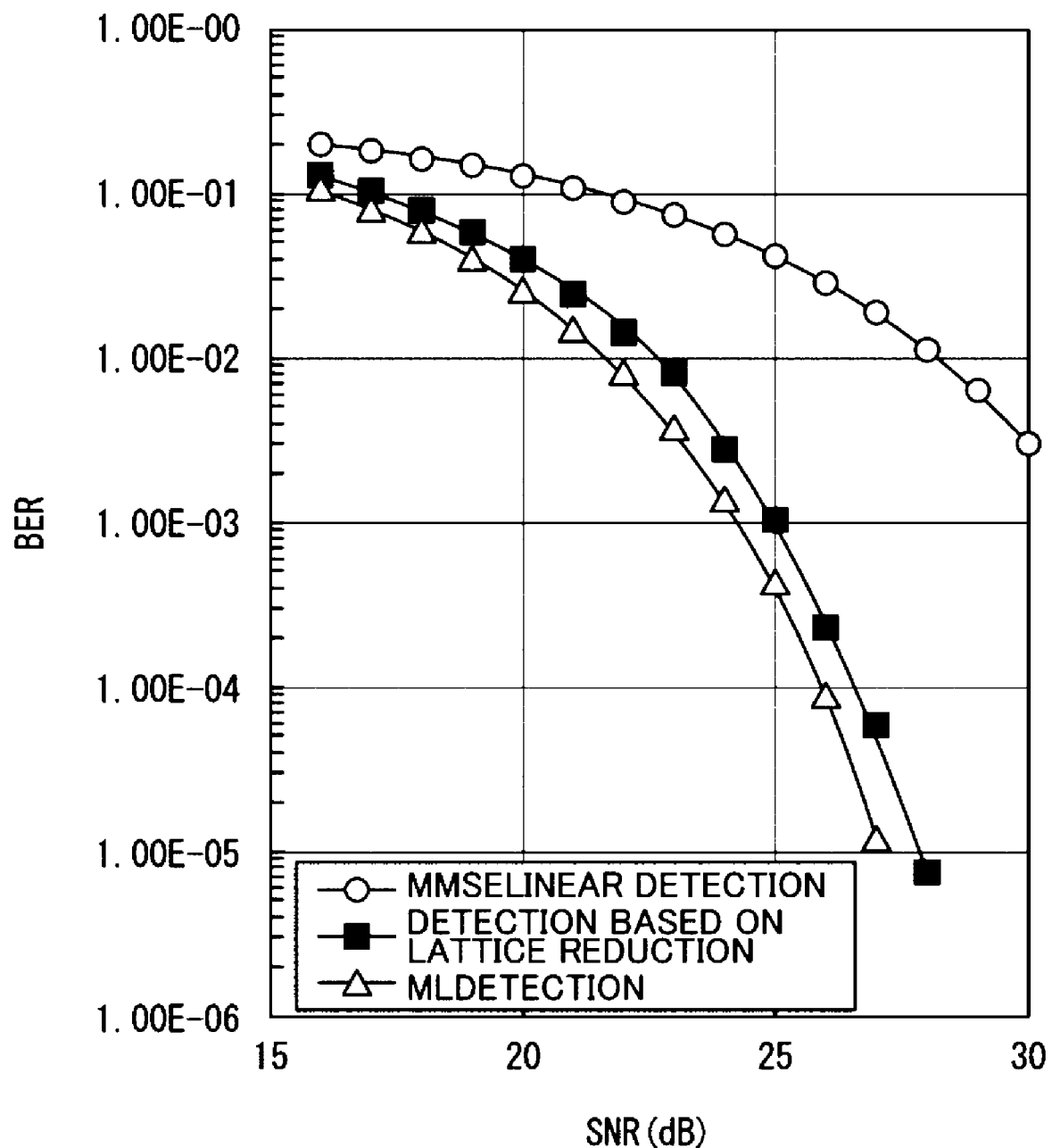
FIG. 8 is a diagram illustrating a relation example between a signal to noise ratio and bit error rate for each separation and detection method according to the second embodiment.

FIG. 8 is a diagram showing a relation example between the signal-to-noise ratio (SNR) and the bit error ratio (BER), for each separation detection method. In FIG. 8, the bit error rate is adopted so that the detection accuracy is quantitatively compared.

In FIG. 8, the detection processing based on the maximum likelihood decoding shows the best detection accuracy. In the linear detection based on the minimum mean squared error, the detection accuracy is greatly deteriorated over a wide SNR region due to the effect of mode dependent loss.

On the other hand, the MIMO signal detection processing based on the lattice reduction in the signal detection device 41b shows excellent detection accuracy compared with linear detection based on a minimum mean squared error. In addition, the detection accuracy by MIMO signal detection processing based on lattice reduction in the signal detection device 41b is gradually close to the detection accuracy by the detection processing based on the maximum likelihood decoding.

Figure 9:
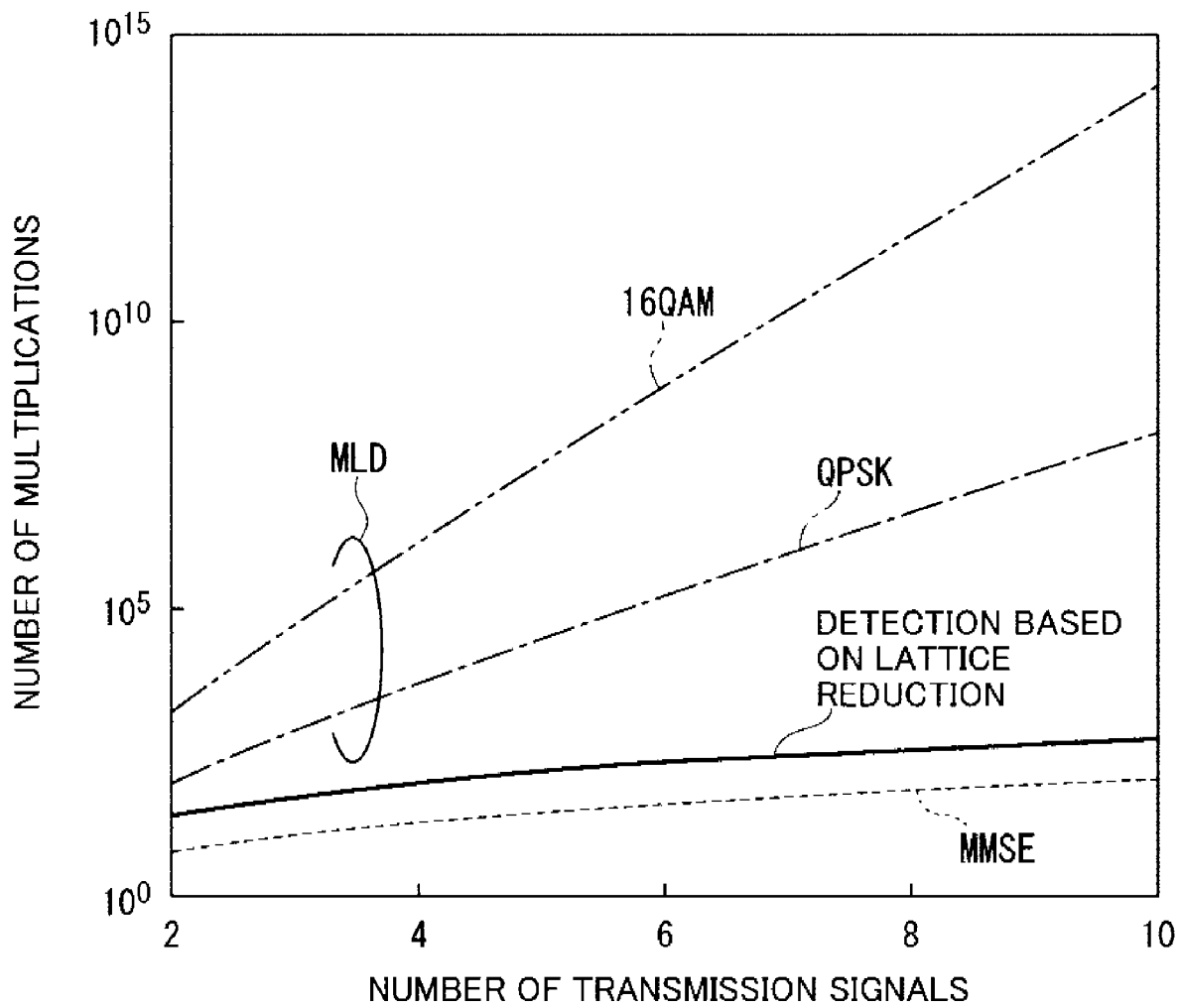
FIG. 9 is a diagram illustrating a relation example between the number of the transmission signa and the number of multiplications according to the second embodiment.

FIG. 9 is a diagram showing a relation example between the number of transmission signals and the number of multiplications (the number of complex multiplications). In FIG. 9, the calculation amounts required when N transmission signals are detected based on the reception signals are shown for each separation detection method. Maximum likelihood detection (MLD)method was performed on the 16QAM signal and the QPSK signal, respectively. The number of complex multiplications is adopted so that the calculation amount is quantitatively compared.

In the detection processing based on the maximum likelihood decoding, candidates of transmission signals are searched for in total. Therefore, in the detection processing based on the maximum likelihood decoding, the calculation amount becomes very large. In addition, the number of candidates for the transmission signal is increased in accordance with the increase of the number of multi-values of the signal. For this reason, for example, when "N=10"16QAM signals are detected, the complex multiplication of 1014 times is required.

The linear detection processing based on the minimum mean squared error is a simple detection method with a small calculation amount. However, as shown in FIG. 8, the detection accuracy by the linear detection processing based on the minimum mean squared error is low.

On the other hand, the calculation amount of the MIMO signal detection processing based on the lattice reduction in the signal detection device 41b is suppressed to about three times the calculation amount of the linear detection processing based on the minimum mean squared error. The calculation amount of the linear detection processing based on the minimum mean squared error and the calculation amount of the MIMO signal detection processing based on the lattice reduction do not depend on the format of the signal to be detected.

In this way, in the communication system 1a provided with the transmission channel having the mode dependent loss, the MIMO signal detection based on the lattice reduction can reduce the error of information with the operation amount equal to or less than the predetermined threshold.

Third Embodiment

In a third embodiment, the point where the signal detection device directly executes the update of the signal separation and the update of the separation matrix in the LR domain is different from the first embodiment and the second embodiment. For the third embodiment, the differences from the first embodiment and the second embodiment will be mainly described.

The configuration of the communication system of the third embodiment is the same as that of the communication system 1a of the first embodiment. That is, the communication system of the third embodiment includes the transmission device 2, the multimode fiber 3, and the reception device.

Figure 10:
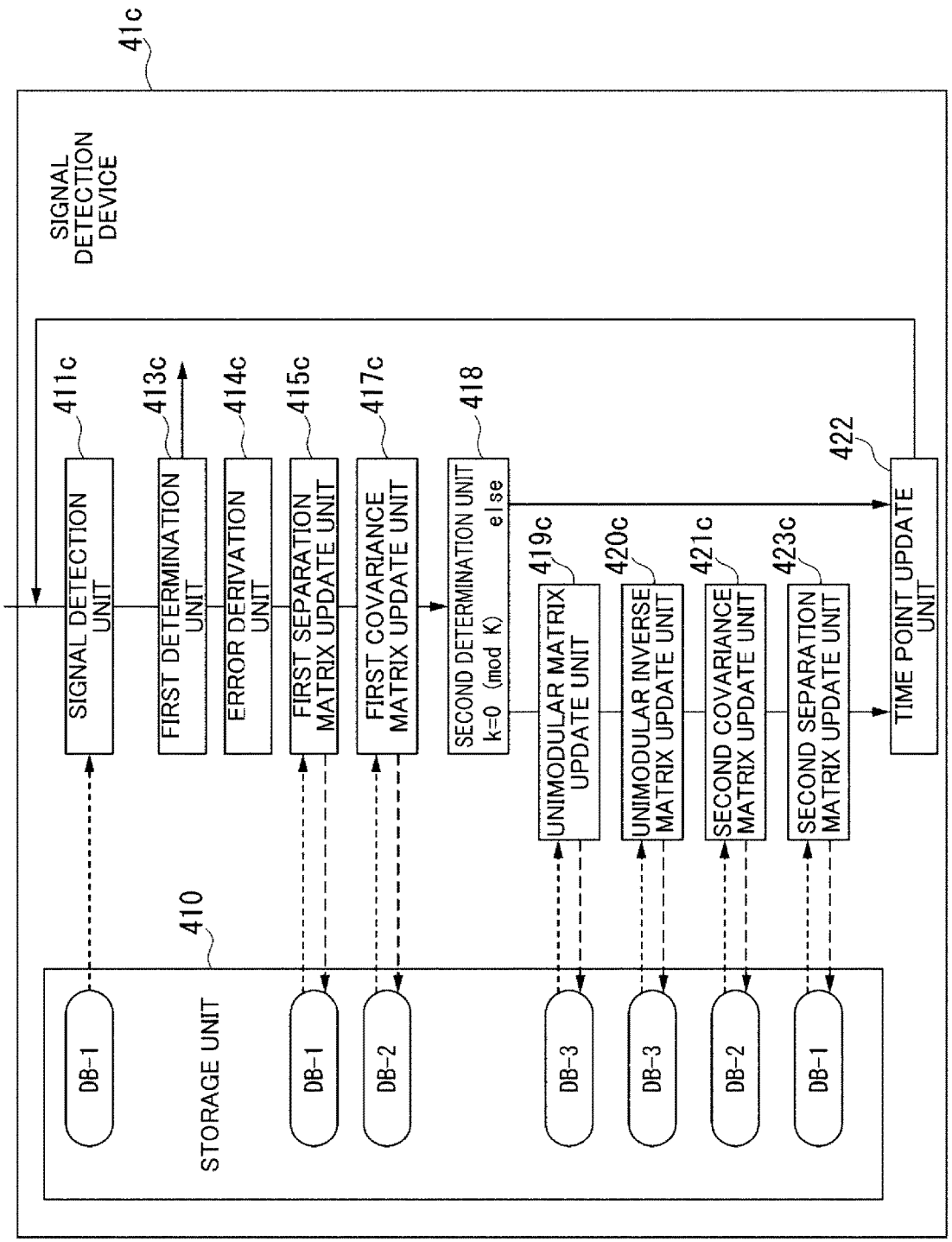
FIG. 10 is a diagram illustrating a configuration example of the signal detection device according to the third embodiment.

FIG. 10 is a diagram illustrating a configuration example of a signal detection device 41c (signal detection apparatus). The signal detection device 41c is provided in the reception device. The signal detection device 41c includes the storage unit 410, a signal detection unit 411c, a first determination unit 413c, an error derivation unit 414c, a separation matrix update unit 415c, a first covariance matrix update unit 417c, the second determination unit 418, a unimodular matrix update unit 419c, a unimodular inverse matrix update unit 420c, the time point update unit 422, a second covariance matrix update unit 421c, and a second separation matrix update unit 423c.

A signal detection unit 411d detects the inputted electric signal (the reception signal). At the sampling time point "k", the estimation vector of the transmission signal vector based on the LR domain "^~x(k)" is represented as shown in formula (23).

[Math. 23]

$$\hat{\tilde{x}} = \tilde{W}^T(k) y(k) \tag{23}$$

Here, "~W(k)" represents the separation matrix (the signal separation matrix) based on the LR domain.

The first determination unit 413c determines the signal in the LR domain (the system that increases orthogonality of the transmission channel matrix "H") by using the estimation vector "^~x(k)" of a transmission signal vector based on the LR domain. That is, the first determination unit 413c derives a sampling value (a determination value vector) of the reception signal vector for the estimation vector of the transmission signal vector based on the LR domain. For example, the first determination unit 413c derives the determination value vector "~xHD(k)" of the transmission signal vector based on the LR domain as shown in formula 24 by using the unimodular reverse matrix "Tinv(k)".

[Math. 24]

$$\tilde{x}_{HD}(k) = Q(\hat{\tilde{x}}(k), T^{inv}(k)) \tag{24}$$

Further, the first determination unit 413c derives the determination value vector "xHD(k)" of the transmission signal vector by using the unimodular matrix "T(k)" and the determination value vector "^~xHD(k)" of the estimation value vector of the transmission signal vector based on the LR domain, as shown in formula (25).

[Math. 25]

$$x_{HD}(k) = T(k) \tilde{x}_{HD}(k) \tag{25}$$

The error derivation unit 414c derives the error signal vector based on the LR domain as shown in formula (26).

[Math. 26]

$$\tilde{\in}(k) = \tilde{\hat{x}}_{HD}(k) - \hat{\tilde{x}}(k) \tag{26}$$

The separation matrix update unit 415c updates the separation matrix "~W(k)" based on the LR domain. That is, the separation matrix update unit 415c updates the separation matrix "~W(k)" based on the LR domain as shown in formula (27) to derive the separation matrix "~W(k+1)" based on the LR domain.

[Math. 27]

$$\tilde{W}^T(k+1) = \tilde{W}^T(k) + \mu \tilde{\in}(k) y^H(k) \tag{27}$$

The first covariance matrix update unit 417c updates the error covariance matrix "~Re(k)" based on the LR domain, as shown in formula (28).

[Math. 28]

$$\tilde{R}_e(k+1) = \delta \tilde{R}_e(k) + \tilde{\in}(k) \tilde{\in}^H(k) \tag{28}$$

A method for deriving the integer "Λi, j(k)" by the unimodular matrix update unit 419*c*, a method for selecting the pair of (i, j) by the unimodular matrix update unit 419*c*, and a method for updating the unimodular matrix "T(k)" by the unimodular matrix update unit 419*c* are the same as the method by the unimodular matrix update unit 419*a* described in the first embodiment.

The method for updating the unimodular inverse matrix "Tinv(k)" by the unimodular inverse matrix update unit 420*c* is the same as the method for updating by the unimodular inverse matrix update unit 420*a* described in the first embodiment.

The method for updating the error covariance matrix "~Re(k)" based on the LR domain by the second covariance matrix update unit 421*c* is the same as the method for updating by the second covariance matrix update unit 421*a* described in the first embodiment.

The second separation matrix update unit 423*c* updates the separation matrix "~W(k)" based on the LR domain as shown in formula (29).

[Math. 29]

$$\tilde{W}^T(k) \leftarrow \Lambda_{i,j}(k)\tilde{W}^T(k) \tag{29}$$

The second separation matrix update unit 423*c* may update the separation matrix "~W(k)" based on the LR domain as shown in formula (30).

[Math. 30]

$$\tilde{W}(k) \leftarrow \tilde{W}(k)\Lambda_{i,j}^T \tag{30}$$

Next, operation example of the signal detection device 41*c* will be described.

FIG. 11 is a diagram illustrating an algorithm example of the signal detection device 41*c*. As shown in a first line, the signal detection unit 411*c* detects the inputted electric signal (the reception signal) as shown in the formula (23). As shown in a second line, the first determination unit 413*c* derives the determination value vector "~xHD(k)" of the transmission signal vector based on the LR domain, as shown in the formula (24), by using the unimodular inverse matrix "Tinv(k)".

As shown in a third line, the first determination unit 413*c* derives the error signal vector based on the LR domain as shown in the formula (26). As shown in a fourth line, the first determination unit 413*c* derives the determination value vector "xHD(k)" of the transmission signal vector, as shown in the formula (25), by using the unimodular matrix "T(k)".

As shown in a fifth line, the separation matrix update unit 415*c* update the separation matrix "~W(k)" based on the LR domain as shown in formula (27) to derive the separation matrix "~W(k+1)" based on the LR domain. As shown in a sixth line, the first covariance matrix update unit 417*c* updates the error covariance matrix "~Re(k)" based on the LR domain, as shown in the formula (28).

The operations of seventh to thirteenth lines shown in FIG. 11 are same as those of the ninth to fifteenth lines shown in FIG. 4. As shown in a fourteenth line, the second separation matrix update unit 423*c* updates the separation matrix "~W(k)" based on the LR domain.

As described above, the signal detection unit 411*c* (signal detector) multiplies the reception signal vector "y" by the separation matrix "~W" based on the LR domain (reduced basis), thereby deriving the estimation vector "^ ~x" of the transmitted signal vector based on the LR domain. The first determination unit 413*c* (first determiner) derives the determination value vector "~xHD" of the transmission signal vector based on an LR domain by using the inverse matrix "Tinv" of the unimodular matrix as shown in the formula (24). The first determination unit 413*c* derives the determination value vector "xHD" of the transmission signal vector by using, as shown in the formula (25), the determination value vector "^~xHD" of the estimation vector of the transmission signal vector based on the LR domain, and the unimodular matrix "T".

The error derivation unit 414*c* (error calculator) (error derivator) derives the error signal vector between the determination value vector "~xHD" of the transmission signal vector based on the LR domain and an estimation vector "^~x" of the transmission signal vector based on the LR domain as the error signal vector based on the LR domain as shown in the formula (26). The separation matrix update unit 415*c* (the first update unit) (first updater) updates the separation matrix "~W" based on the LR domain by using the error signal vector based on the LR domain. The first covariance matrix update unit 417*c* (the second update unit) (second updater) updates the error covariance matrix "~Re" based on the LR domain by using the error signal vector based on the LR domain.

The second determination unit 418 (second determiner) determines whether or not the predetermined condition is satisfied. The unimodular matrix update unit 419*c* (the third update unit) (third updater) updates the unimodular matrix "T" when it is determined that the predetermined condition is satisfied. The unimodular inverse matrix update unit 420*c* (the third update unit) (third updater) updates the inverse matrix "Tinv" of the unimodular matrix when it is determined that the predetermined condition is satisfied. The second covariance matrix update unit 421*c* (the third update unit) (third updater) updates the error covariance matrix "~Re" based on the LR domain when it is determined that the predetermined condition is satisfied. The second separation matrix update unit 423*c* (the third update unit) (third updater) updates the separation matrix "~W" based on the LR domain when it is determined that the predetermined condition is satisfied.

Thus, it is possible to reduce the error of the information placed on the optical signal transmitted through the transmission line having the time variability with the calculation amount equal to or less than the predetermined threshold.

Fourth Embodiment

In a fourth embodiment, the point where the signal separation is executed by the method described in the third embodiment and the update for the unimodular matrix, the unimodular inverse matrix, and the error covariance matrix based on the LR domain is performed by each method described in the second embodiment is different from the first embodiment. For the fourth embodiment, the differences from the first embodiment will be mainly described.

The configuration of the communication system of the fourth embodiment is the same as that of the communication system 1*a* of the first embodiment. That is, the communication system of the fourth embodiment includes the transmission device 2, the multimode fiber 3, and the reception device.

Figure 12:
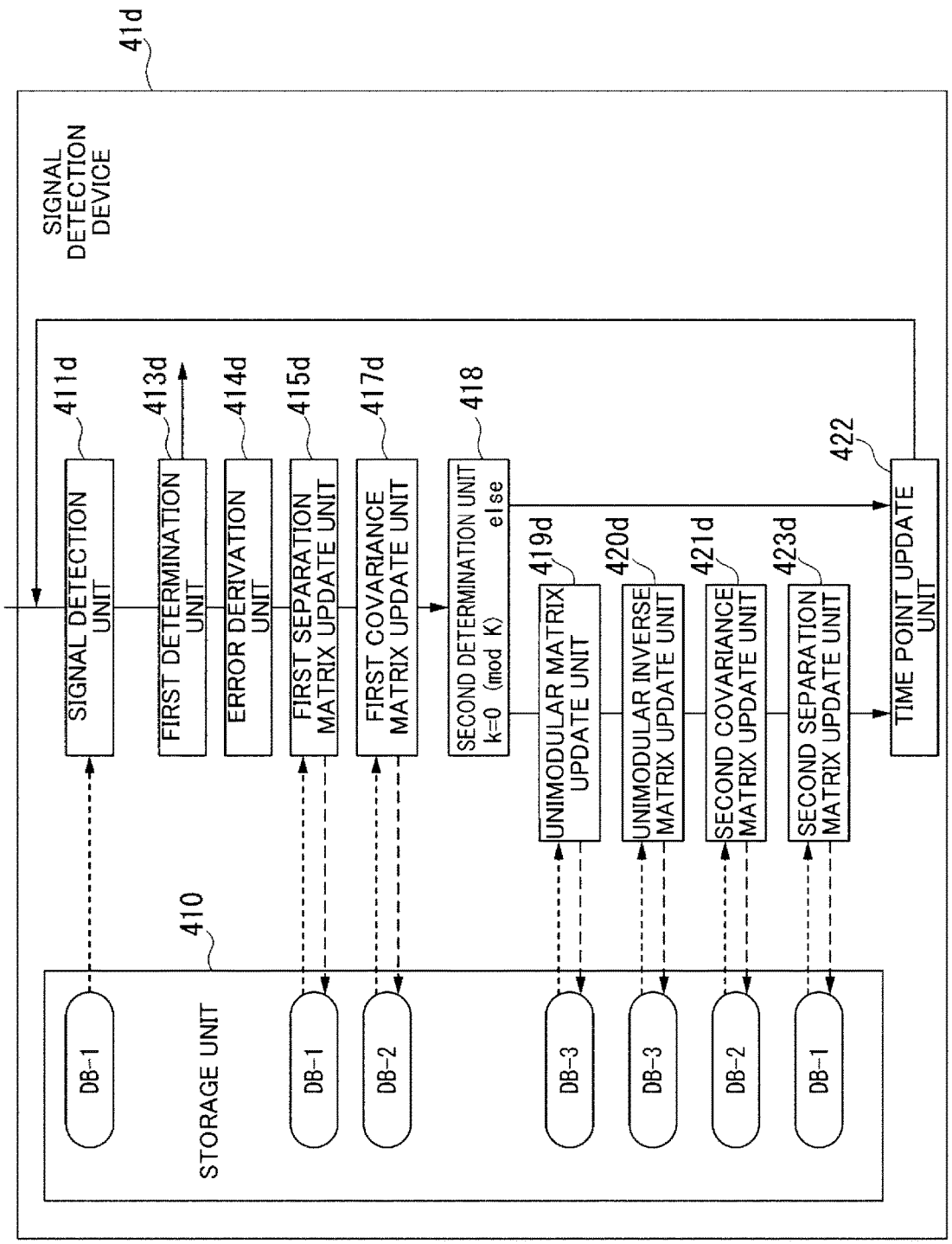
FIG. 12 is a diagram illustrating a configuration example of the signal detection device according to the fourth embodiment.

FIG. 12 is a diagram illustrating a configuration example of a signal detection device 41*d* (signal detection apparatus). The signal detection device 41*d* is provided in the reception device. The signal detection device 41*d* includes the storage unit 410, a signal detection unit 411*d*, the first determination unit 413*c*, an error derivation unit 414*d*, a separation matrix update unit 415d, a first covariance matrix update unit 417d, the second determination unit 418, a unimodular matrix update unit 419d, a unimodular inverse matrix update unit 420d, the time point update unit 422, a second covariance matrix update unit 421d, and a second separation matrix update unit 423d.

The separation matrix update unit 415c updates the separation matrix "~W(k)" based on the LR domain as shown in formula (31).

[Math. 31]

$$\tilde{w}_i(k) \leftarrow \tilde{w}_i(k) + \lambda_{i,j}(k)\tilde{w}_j(k) \tag{31}$$

Here, "~wi(k)" represents the i-th column of the separation matrix "~W(k)" based on the LR domain.

Next, operation example of the signal detection device 41d will be described.

FIG. 13 is a diagram illustrating an algorithm example of the signal detection device 41d. The operations from a first line to a tenth line shown in FIG. 13 are the same as those from the first line to the tenth line shown in FIG. 11 in the third embodiment. The operations from an eleventh line to a fourteenth line shown in FIG. 13 are the same as those from the thirteenth line to the sixteenth line in FIG. 7 in the second embodiment. As shown in a fifteenth line of FIG. 13, the separation matrix update unit 415c updates the separation matrix "~W(k)" based on the LR domain as shown in the formula (31).

As described above, the signal detection unit 411d multiplies the reception signal vector "y" by the separation matrix "~W" based on the LR domain (reduced basis), thereby deriving the estimation vector "^~x" of the transmission signal vector based on the LR domain. The first determination unit 413d derives the determination value vector "~xHD" of the transmission signal vector based on the LR domain by using the inverse matrix "Tiny" of the unimodular matrix as shown in the formula (24). The first determination unit 413d derives the determination value vector "xHD" of the transmission signal vector by using, as shown in the formula (25), the determination value vector "^~xHD" of the estimation vector of the transmission signal vector based on the LR domain, and the unimodular matrix "T".

The error derivation unit 414d derives the error signal vector between the determination value vector "~xHD" of the transmission signal vector based on the LR domain and the estimation vector "^~x" of the transmission signal vector based on the LR domain as the error signal vector based on the LR domain as shown in the formula (26). The separation matrix update unit 415d (the first update unit) updates the separation matrix "~W" based on the LR domain by using the error signal vector based on the LR domain. The first covariance matrix update unit 417d (the second update unit) updates the error covariance matrix "~Re" based on the LR domain by using the error signal vector based on the LR domain.

The second determination unit 418 determines whether or not the predetermined condition is satisfied. The unimodular matrix update unit 419d (the third update unit) updates the unimodular matrix "T" when it is determined that the predetermined condition is satisfied. The unimodular inverse matrix update unit 420d (the third update unit) updates the inverse matrix "Tiny" of the unimodular matrix when it is determined that the predetermined condition is satisfied. The second covariance matrix update unit 421d (the third update unit) updates the error covariance matrix "~Re" based on the LR domain when it is determined that the predetermined condition is satisfied. The second separation matrix update unit 423d (the third update unit) updates the separation matrix "~W" based on the LR domain as shown in the formula (31) when it is determined that the predetermined condition is satisfied.

Thus, it is possible to reduce the error of the information placed on the optical signal transmitted through the transmission line having the time variability with the calculation amount equal to or less than the predetermined threshold.

Next, an example of a hardware configuration of the signal detection device 41 will be described.

Figure 14:
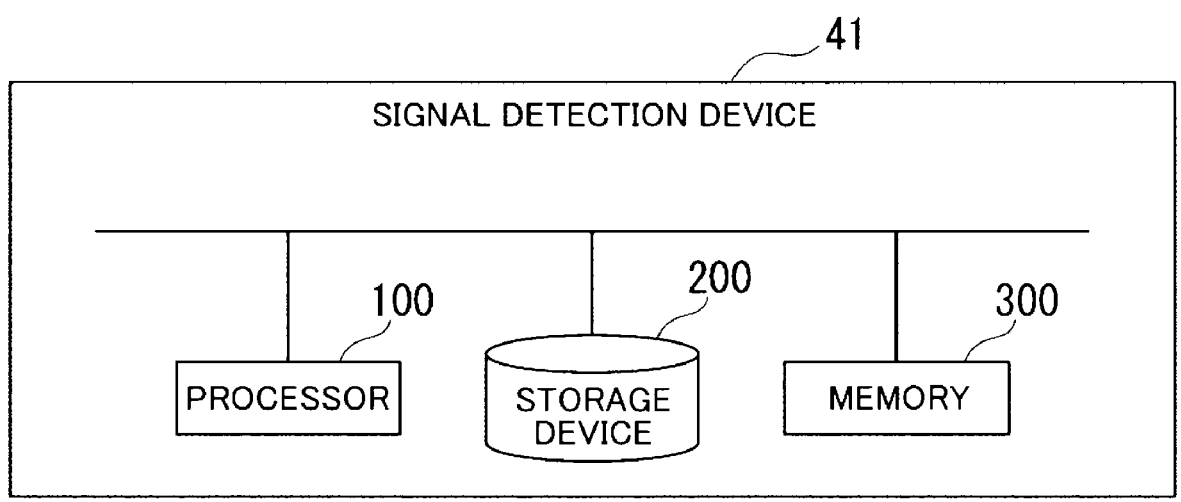
FIG. 14 is a diagram illustrating a configuration example of a hardware of the signal detection device in each embodiment.

FIG. 14 is a diagram illustrating a hardware configuration example of the signal detection device 41 according to each embodiment. Each device of the present disclosure can also be implemented by a computer and a program, and the program can be recorded in a recording medium or provided through a network.

A part or all of each functional units of the signal detection device 41 are implemented as a software by a processor 100 such as a CPU (Central Processing Unit) executing a program stored in a storage device 200 including a non-volatile recording medium (non-transitory recording medium) and in a memory 300. The program may be recorded on a computer-readable recording medium. The computer-readable recording medium is a portable medium such as a flexible disc, an optical magnetic disc, an ROM (Read Only Memory) or a CD-ROM (Compact Disc Read Only Memory) and a non-transitory recording medium such as a storage device including a hard disk built in computer system or the like, for example.

A part or the entirety of the functional units of the signal detection device 41 may be implemented by a hardware including an electronic circuit or a circuitry in which an LSI (Large Scale Integration circuit), an ASIC (Application Specific Integrated Circuit), a PLD (Programmable Logic Device), an FPGA (Field Programmable Gate Array), or the like is used.

Although the embodiments of the present invention have been described in detail with reference to the drawings, specific configurations are not limited to these embodiments, and designs and the like within a range that does not deviating from the gist of the present invention are also included.

In each of the above embodiments, the communication system performs multiplexing optical transmission using the spatial mode in the multimode fiber or the few-mode fiber, for example. The communication system is not limited to a system for executing a specific communication as long as it is a system for executing a communication. For example, the communication system may perform multiplexing optical transmission using spatial modes in the coupled multicore fiber. For example, the communication system may be any of a wireless communication system, a satellite communication system, a communication system between a recording medium and a chip, and the like.

INDUSTRIAL APPLICABILITY

The present invention is applicable to a device for separating and detecting a plurality of signals by the MIMO-type signal processing.

REFERENCE SIGNS LIST

1a Communication system
2 Transmission device
3 Multimode fiber 4a, 4b, 4c, 4d Reception device
20 Transmitter
40 Receiver
41, 41a, 41b, 41c, 41d Signal detection device
100 Processor
200 Storage device
300 Memory
411a, 411b, 411c, 411d Signal detection unit
412a, 412b Basis conversion unit
413a, 413b, 413c, 413d First determination unit
414a, 414b, 414c, 414d Error derivation unit
415a, 415b, 415c, 415d Separation matrix update unit
416a, 416b Error basis conversion unit
417a, 417b, 417c, 417d First covariance matrix update unit
418 Second determination unit
419a, 419b, 419c, 419d Unimodular matrix update unit
420a, 420b, 420c, 420d Unimodular inverse matrix update unit
421a, 421b, 421c, 421d Second covariance matrix update unit
422 Time point update unit
423c, 423d Second separation matrix update unit

The invention claimed is:

1. A signal detection device comprising:
a signal detector configured to multiply the reception signal vector by a separation matrix to derive an estimation vector of a transmission signal vector;
a first convertor configured to convert the estimation vector of the transmission signal vector to the estimation vector of the transmission signal vector based on a reduced basis by using an inverse matrix of a unimodular matrix;
a first determiner configured to convert the estimation vector of the transmission signal vector based on the reduced basis to a determination value vector of the transmission signal vector by using the inverse matrix of the unimodular matrix and the unimodular matrix;
a first updater configured to update the separation matrix by using a first error signal vector between the estimation vector of the transmission signal vector and the determination value vector of the transmission signal vector;
a second converter configured to convert the first error signal vector to a second error signal vector based on the reduced basis by using the inverse matrix of the unimodular matrix;
a second updater configured to update an error covariance matrix based on the reduced basis by using the second error signal vector based on the reduced basis;
a second determiner configured to determine whether or not a predetermined condition is satisfied; and
a third updater configured to update the unimodular matrix, the inverse matrix of the unimodular matrix, and the error covariance matrix based on the reduced basis
when it is determined that the predetermined condition is satisfied.

2. The signal detection device comprising:
the signal detector configured to multiply the reception signal vector by the separation matrix based on a reduced basis to derive the estimation vector of the transmission signal vector based on the reduced basis;
the first determiner configured to derive the determination value vector of the transmission signal vector based on the reduced basis by using the inverse matrix of the unimodular matrix and derive the determination value vector of the transmission signal vector by using the determination value vector of the estimation vector of the transmission signal vector based on the reduced basis, and the unimodular matrix;
an error derivator configured to derive an error signal vector between the determination value vector of the transmission signal vector based on the reduced basis and the estimation vector of the transmission signal vector based on the reduced basis as an error signal vector based on the reduced basis;
the first updater configured to update the separation matrix based on the reduced basis using the error signal vector based on the reduced basis;
the second updater configured to update the error covariance matrix based on the reduced basis by using the error signal vector based on the reduced basis;
the second determiner configured to determine whether or not the predetermined condition is satisfied; and
the third updater configured to update the unimodular matrix, the inverse matrix of the unimodular matrix, the error covariance matrix based on the reduced basis and the separation matrix based on the reduced basis
when it is determined that the predetermined condition is satisfied.

3. A signal detection method executed by the signal detection device, the signal detection method comprising:
deriving the estimation vector of the transmission signal vector by multiplying the reception signal vector by the separation matrix;
converting the estimation vector of the transmission signal vector to the estimation vector of the transmission signal vector based on a reduced basis by using the inverse matrix of the unimodular matrix;
converting the estimation vector of the transmission signal vector based on the reduced basis to the determination value vector of the transmission signal vector by using the inverse matrix of the unimodular matrix and the unimodular matrix;
updating the separation matrix by using the first error signal vector between the estimation vector of the transmission signal vector and the determination value vector of the transmission signal vector;
converting the first error signal vector to the second error signal vector based on the reduced basis by using the inverse matrix of the unimodular matrix;
updating the error covariance matrix based on the reduced basis by using the second error signal vector based on the reduced basis;
determining whether or not the predetermined condition is satisfied; and
updating the unimodular matrix, the inverse matrix of the unimodular matrix, and the error covariance matrix based on the reduced basis when it is determined that the predetermined condition is satisfied.

4. The signal detection method executed by the signal detection device, the signal detection method comprising:
multiplying the reception signal vector by the separation matrix based on a reduced basis to derive the estimation vector of the transmission signal vector based on the reduced basis;
deriving the determination value vector of the transmission signal vector based on the reduced basis by using the inverse matrix of the unimodular matrix and deriving the determination value vector of the transmission signal vector by using the determination value vector of the estimation vector of the transmission signal vector based on the reduced basis, and the unimodular matrix;

deriving an error signal vector between the determination value vector of the transmission signal vector based on the reduced basis and the estimation vector of the transmission signal vector based on the reduced basis as an error signal vector based on the reduced basis;

updating the separation matrix based on the reduced basis using the error signal vector based on the reduced basis;

updating the error covariance matrix based on the reduced basis by using the error signal vector based on the reduced basis;

determining whether or not the predetermined condition is satisfied; and updating the unimodular matrix, the inverse matrix of the unimodular matrix, the error covariance matrix based on the reduced basis and the separation matrix based on the reduced basis when it is determined that the predetermined condition is satisfied.

5. A non-transitory computer-readable storage medium storing a program for causing a computer to function as the signal detection device according to claim 1.

6. A non-transitory computer-readable storage medium storing a program for causing a computer to function as the signal detection device according to claim 2.

* * * * *